(12) United States Patent
Li et al.

(10) Patent No.: US 12,219,451 B2
(45) Date of Patent: Feb. 4, 2025

(54) BLUETOOTH SCANNING METHOD AND ELECTRONIC DEVICE

(71) Applicant: HUAWEI TECHNOLOGIES CO., LTD., Guangdong (CN)

(72) Inventors: Zhuofei Li, Beijing (CN); Liang Wang, Shanghai (CN); Lei Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/485,288

(22) Filed: Oct. 11, 2023

(65) Prior Publication Data
US 2024/0040357 A1  Feb. 1, 2024

Related U.S. Application Data

(63) Continuation of application No. 17/603,576, filed as application No. PCT/CN2020/084369 on Apr. 13, 2020, now Pat. No. 11,849,376.

(30) Foreign Application Priority Data

Apr. 16, 2019  (CN) .......................... 201910305349.9

(51) Int. Cl.
*H04W 4/80* (2018.01)
*H04W 12/069* (2021.01)
*H04W 76/14* (2018.01)

(52) U.S. Cl.
CPC ........... *H04W 4/80* (2018.02); *H04W 12/069* (2021.01); *H04W 76/14* (2018.02)

(58) Field of Classification Search
CPC ..... H04W 4/80; H04W 76/14; H04W 12/069; H04W 12/08; H04W 12/37; H04W 12/50
See application file for complete search history.

(56) References Cited

U.S. PATENT DOCUMENTS 9,858,781 B1  1/2018  Campero et al.
2012/0314571 A1  12/2012  Forssell
(Continued)

FOREIGN PATENT DOCUMENTS

CN  102255947 A  11/2011
CN  103049938 A  4/2013
(Continued)

OTHER PUBLICATIONS

HCI requirements, source, https://source.android.com/docs/core/connect/bluetooth/hci_requirements?hl=zh-cn#advertising-packet-content-filter, Apr. 12, 2023, 22 pages.
(Continued)

*Primary Examiner* — Tuan H Nguyen

(57) ABSTRACT

Embodiments of this application provide a Bluetooth scanning method, and the method is applied to an electronic device. The electronic device includes a Bluetooth chip and a Bluetooth agent module, and the Bluetooth chip is connected to the Bluetooth agent module. The method includes: The Bluetooth agent module indicates the Bluetooth chip to scan for a device identifier. If a first device identifier in the device identifiers is obtained through scanning, the Bluetooth chip notifies the Bluetooth agent module. Based on the first device identifier, the Bluetooth agent module establishes a channel to a first device, or notifies an application corresponding to the first device identifier. The embodiments of this application are implemented, to improve service execution convenience, and reduce power consumption and memory usage of the electronic device.

20 Claims, 22 Drawing Sheets

(56) References Cited

U.S. PATENT DOCUMENTS

| | | | |
|---|---|---|---|
| 2013/0157655 A1 | 6/2013 | Smith, II et al. | |
| 2015/0341766 A1 | 11/2015 | Nelson et al. | |
| 2015/0341767 A1 | 11/2015 | Nelson et al. | |
| 2015/0362997 A1 | 12/2015 | Hatton | |
| 2016/0055474 A1 | 2/2016 | Syed | |
| 2016/0119770 A1 | 4/2016 | Ryu et al. | |
| 2016/0164725 A1* | 6/2016 | Wu | H04L 12/40 370/257 |
| 2016/0307380 A1 | 10/2016 | Ho et al. | |
| 2016/0309323 A1 | 10/2016 | Zarakas et al. | |
| 2016/0337863 A1 | 11/2016 | Robinson et al. | |
| 2017/0210341 A1 | 7/2017 | Nelson et al. | |
| 2018/0270883 A1 | 9/2018 | Wu et al. | |
| 2019/0052721 A1 | 2/2019 | Romano et al. | |
| 2019/0058596 A1 | 2/2019 | Chang et al. | |

FOREIGN PATENT DOCUMENTS

| | | | |
|---|---|---|---|
| CN | 103944734 A | 7/2014 | |
| CN | 104318741 A | 1/2015 | |
| CN | 104540190 A | 4/2015 | |
| CN | 104853050 A | 8/2015 | |
| CN | 104899742 A | 9/2015 | |
| CN | 105376637 A | 3/2016 | |
| CN | 105488053 A | 4/2016 | |
| CN | 105550877 A | 5/2016 | |
| CN | 105657166 A | 6/2016 | |
| CN | 105788047 A | 7/2016 | |
| CN | 105933306 A | 9/2016 | |
| CN | 106127890 * | 11/2016 | G07C 9/00 |
| CN | 106127890 A | 11/2016 | |
| CN | 106792488 A | 5/2017 | |
| CN | 106846579 A | 6/2017 | |
| CN | 106850540 A | 6/2017 | |
| CN | 107006049 A | 8/2017 | |
| CN | 107135476 A | 9/2017 | |
| CN | 107146332 A | 9/2017 | |
| CN | 107578562 A | 1/2018 | |
| CN | 107770762 A | 3/2018 | |
| CN | 108040354 A | 5/2018 | |
| CN | 108564689 A | 9/2018 | |
| CN | 108764392 A | 11/2018 | |
| CN | 108922000 A | 11/2018 | |
| CN | 108924805 A | 11/2018 | |
| CN | 109417758 A | 3/2019 | |
| CN | 110072221 A | 7/2019 | |
| EP | 2991041 A2 | 3/2016 | |
| EP | 3287934 A1 | 2/2018 | |
| JP | 2013182500 A | 9/2013 | |
| JP | 2017503289 A | 1/2017 | |
| KR | 20050122612 A | 12/2005 | |
| WO | 2017180388 A1 | 10/2017 | |
| WO | 2019069257 A1 | 4/2019 | |

OTHER PUBLICATIONS com_android_bluetooth_gatt.cpp, Android code search, https://cs.android.com/android/platform/superproject/+/master:packages/modules/Bluetooth/android/app/jni/com_android_bluetooth_gatt.cpp;l=224?q=scan_result_cbandss=androidandhl=zh-cn, 2013, 1 page.
Bluetooth service, xiaomi, https://developers.xiaoai.mi.com/voiceservice/Bluetooth/index, Jan. 2020, 3 pages.

* cited by examiner

BLUETOOTH SCANNING METHOD AND ELECTRONIC DEVICE

CROSS-REFERENCE TO RELATED APPLICATIONS

This application is a continuation of U.S. patent application Ser. No. 17/603,576, filed on Oct. 13, 2021, which is a national stage of International Application No. PCT/CN2020/084369, filed on Apr. 13, 2020, which claims priority to Chinese Patent Application No. 201910305349.9, filed on Apr. 16, 2019. All of the aforementioned patent applications are hereby incorporated by reference in their entireties.

TECHNICAL FIELD

This application relates to the field of electronic technologies, and in particular, to a Bluetooth scanning method and an electronic device.

BACKGROUND

With continuous development of a Bluetooth function on an electronic device, the Bluetooth function on the electronic device is more widely applied in a user's life. The Bluetooth function on the electronic device may be used in scenarios such as unlocking a vehicle lock and assisting another device in performing facial payment, to bring convenience to the user.

For example, the Bluetooth function is used to unlock the vehicle lock. The user may start an application, corresponding to a vehicle key, on the electronic device and a Bluetooth scanning function on the electronic device. After a processor of the electronic device obtains, through scanning and by using a Bluetooth chip, a device identifier corresponding to a vehicle, the vehicle may perform security verification on the application corresponding to the vehicle key. If the verification succeeds, the vehicle lock is unlocked.

In the foregoing process of unlocking the vehicle lock by using the Bluetooth function, a real-time operation of the user is required. This reduces convenience. In addition, if the processor in the electronic device keeps monitoring a scanning result of the device identifier of the vehicle for a long time, power consumption and memory usage of the electronic device are significantly increased.

SUMMARY

This application discloses a Bluetooth scanning method and an electronic device, to improve service execution convenience, and reduce power consumption and memory usage of the electronic device.

According to a first aspect, an embodiment of this application provides a Bluetooth scanning method, and the method is applied to an electronic device. The electronic device includes a Bluetooth chip and a Bluetooth agent module, and the Bluetooth chip is connected to the Bluetooth agent module. The method includes: The Bluetooth agent module indicates the Bluetooth chip to scan for a device identifier. If a first device identifier in the device identifiers is obtained through scanning, the Bluetooth chip notifies the Bluetooth agent module. Based on the first device identifier, the Bluetooth agent module establishes a channel to a first device, or notifies an application corresponding to the first device identifier. The Bluetooth agent module indicates the Bluetooth chip to scan for the device identifier.

That the first device identifier is obtained through scanning may mean that the first device identifier is stored in the Bluetooth chip in an application registration process. The first device is an external Bluetooth device. The first device identifier is first device identification information in this embodiment of this application. For example, the first device identifier is a UUID of the external Bluetooth device.

When the electronic device is in a sleep state (for example, the electronic device is in a screen-off sleep state), if the Bluetooth chip detects that a received device identifier is not included in a device identifier list pre-stored in the Bluetooth chip, the Bluetooth agent module may be in a sleep state. If the Bluetooth chip detects that the received first device identifier is included in the device identifier list pre-stored in the Bluetooth chip, the Bluetooth chip wakes up the Bluetooth agent module, and sends the first device identifier to the Bluetooth agent module. In the foregoing Bluetooth scanning method, the Bluetooth agent module is started only when the Bluetooth chip obtains the first device identifier in the device identifiers through scanning. The Bluetooth agent module and an application processor in the electronic device do not need to be always in a working state, to reduce power consumption and memory usage of the electronic device.

In the foregoing Bluetooth scanning method, the Bluetooth agent module may run an application, and a user does not need to manually run the application. In this way, an execution process is imperceptible to the user, and convenience of the service execution process is improved. The Bluetooth agent module may run the application, but the application does not need to be always run on the electronic device, and the application may be stopped running by the application processor, to further reduce power consumption and memory usage of the electronic device.

In the foregoing Bluetooth scanning method, the Bluetooth agent module may be connected to an SE, and directly establishes a Bluetooth channel between the Bluetooth chip and a Bluetooth device without running the application, to further reduce power consumption and memory usage of the electronic device. The Bluetooth agent module further provides a Bluetooth scanning management platform for a Bluetooth-related service execution process.

In this embodiment of this application, in a phase of registering the application with the electronic device, the Bluetooth agent module indicates a device identifier that needs to be scanned by the Bluetooth chip.

In a possible implementation, after the Bluetooth agent module establishes the channel to the first device based on the first device identifier, the method further includes: The Bluetooth agent module obtains service information corresponding to the first device identifier, and sends the service information to the first device through the channel.

Optionally, the Bluetooth agent module is further connected to a secure storage area (for example, the SE or a TEE). That the Bluetooth agent module obtains service information corresponding to the first device identifier, and sends the service information to the first device through the channel includes: The Bluetooth agent module obtains the service information corresponding to the first device identifier from the secure storage area, and sends the service information to the first device through the channel.

Optionally, the service information is verification information, the verification information is used by the first device to perform verification based on locally stored information and the verification information, and a corresponding service is executed if the verification succeeds.

In a possible implementation, the service information is verification result information, and the verification result information is sent to a server, so that the server executes a corresponding service based on the verification result information.

The first device may establish a communication connection to the server. For example, the service information is a fingerprint comparison result from the SE in the electronic device. Fingerprint verification is performed locally, and then a verification result is sent to the server. This may improve security of user identity information (for example, a fingerprint), and reduce a risk of information leakage.

In a possible implementation, the service information is information related to verification of an electronic vehicle key, and executing the corresponding service refers to unlocking a corresponding vehicle lock.

In the foregoing vehicle lock unlocking scenario, the Bluetooth agent module is started only after the Bluetooth chip detects that a device (the Bluetooth device) from which a Bluetooth broadcast signal comes is registered with the electronic device. The Bluetooth agent module and the application processor in the electronic device do not need to be always in the working state, to reduce power consumption and memory usage of the electronic device.

In the foregoing service execution method process, a Bluetooth channel is directly established between the SE and the Bluetooth device without running the application, to reduce power consumption and memory usage of the electronic device.

In the foregoing service execution method process, the user does not need to manually run the application. In this way, the service execution process is imperceptible to the user, and convenience of the service execution process is improved.

In the foregoing service execution method process, the application does not need to be kept in a running state, to further reduce power consumption and memory usage of the electronic device. In this embodiment of this application, the Bluetooth agent module further provides a management platform for establishing a Bluetooth channel for the Bluetooth-related service execution process.

In a possible implementation, after the Bluetooth agent module establishes the channel to the first device based on the first device identifier, the method further includes: The Bluetooth agent module notifies the application corresponding to the first device identifier. The application obtains the service information corresponding to the first device identifier. The application sends the service information corresponding to the first device identifier to the Bluetooth agent module. The Bluetooth agent module sends the service information corresponding to the first device identifier to the first device through the channel.

The application is further connected to the secure storage area (for example, the SE or the TEE). That the application obtains the service information corresponding to the first device identifier includes: The application obtains the service information corresponding to the first device identifier from the secure storage area.

In a possible implementation, after the Bluetooth agent module notifies, based on the first device identifier, the application corresponding to the first device identifier, the method further includes: The Bluetooth agent module sends the service information from the first device to the application, so that the application displays the service information to the user.

The first device may be a weight scale, and the service information may be weight information.

The application on the electronic device may establish a channel to the weight scale by using a Bluetooth broadcast signal, and the weight scale may upload weight data detected in real time to the application. In the foregoing process of uploading the data of the weight scale, the data of the weight scale can be imperceptibly uploaded without the user manually operating the application on the electronic device.

In the foregoing process in which the weight scale uploads the weight information to the application, in a process of establishing a Bluetooth connection between the Bluetooth device and the Bluetooth chip, the Bluetooth agent module is started only after the Bluetooth chip detects that a device (the weight scale) from which the Bluetooth broadcast signal comes is registered with the electronic device. The Bluetooth agent module and the application processor in the electronic device do not need to be always in the working state, to reduce power consumption and memory usage of the electronic device.

In the foregoing process in which the weight scale uploads the weight information to the application, the user does not need to manually run the application. In this way, the execution process is imperceptible to the user, and convenience of the service execution process is improved.

In the foregoing process in which the weight scale uploads the weight information to the application, the application does not need to be kept in the running state, to further reduce power consumption and memory usage of the electronic device. In this embodiment of this application, the Bluetooth agent module further provides a management platform for the Bluetooth-related service execution process.

In a possible implementation, that the Bluetooth agent module notifies, based on the first device identifier, the application corresponding to the first device identifier includes: The Bluetooth agent module runs, based on the first device identifier, the application corresponding to the first device identifier, and sends the first device identifier to the application. After the Bluetooth agent module notifies, based on the first device identifier, the application corresponding to the first device identifier, the method further includes: The application obtains the service information from the first device, and sends the service information and user account information to a server, so that the server performs verification based on the service information and the user account information that are sent by the application and user information obtained by the first device, and executes a service transaction if the verification succeeds.

In a possible implementation, the user information is a facial image, and executing the service transaction refers to executing a payment transaction by using the user account information as a transaction account.

Optionally, if the application is already in the running state, there is no need to run the application.

In a payment transaction scenario, the Bluetooth agent module is started only after a device from which a Bluetooth broadcast signal received by the Bluetooth chip comes is registered with the electronic device. The Bluetooth agent module and the application processor in the electronic device do not need to be always in the working state, to reduce power consumption and memory usage of the electronic device.

In the payment transaction scenario, the Bluetooth agent module may run the application, and the user does not need to manually run the application. In this way, a service transaction execution process is imperceptible to the user, and convenience of the service transaction process is improved.

In the payment transaction scenario, the Bluetooth agent module may run the application, but the application does not need to be always run on the electronic device, and the application may be stopped running by the application processor, to further reduce power consumption and memory usage of the electronic device.

In the payment transaction scenario, the Bluetooth agent module further provides a Bluetooth scanning management platform for a Bluetooth-related service transaction process.

In the payment transaction scenario, the service information may be first device identity information, and the first device identity information may be sent by the Bluetooth chip to the Bluetooth agent module together with the first device identifier. The first device identity information may be a device ID of the first device. The device ID is in a one-to-one correspondence with the first device.

In a possible implementation, before the Bluetooth agent module indicates the Bluetooth chip to scan for the device identifier, the method further includes: When detecting that a Bluetooth scanning function is disabled, the Bluetooth agent module enables the Bluetooth scanning function. The Bluetooth agent module may enable the Bluetooth scanning function, so that the user does not need to manually enable the Bluetooth scanning function. In this way, the service transaction execution process is imperceptible to the user, and convenience of the service transaction process is improved.

In a possible implementation, the Bluetooth agent module is an application/interface at an application framework layer.

In a possible implementation, before the Bluetooth agent module indicates the Bluetooth chip to scan for the device identifier, the method further includes: The Bluetooth agent module performs permission verification on the application. When the permission verification succeeds, the Bluetooth agent module sends the first device identifier to the Bluetooth chip, so that the Bluetooth chip notifies the Bluetooth agent module when obtaining the first device identifier through scanning.

In a possible implementation, that the Bluetooth agent module performs permission verification on the application includes: The Bluetooth agent module detects whether the first device identifier is included in a locally stored legal device identifier list. When the first device identifier is included in the legal device identifier list, the permission verification succeeds. The legal device identifier list locally stored on the electronic device is used to verify the application, so that a verification process can be reduced, and memory usage and power consumption of the device in the verification process can be reduced.

In a possible implementation, before the Bluetooth agent module performs permission verification on the application, the method further includes: The application obtains a first certificate used to prove permission of the application from a server. The Bluetooth agent module performs permission verification on the application includes: The Bluetooth agent module performs permission verification on the application based on the first certificate.

When the application is installed on the electronic device, the application may send, to the server, a message used to request to deliver the first certificate, and then the server sends the first certificate to the application. In another possible implementation, when the application is installed on the electronic device, the server delivers the first certificate to the application. The certificate delivered by the server is used for identity verification of the application. This reduces a case in which local verification is tampered with, and improves security of the identity verification.

The application on which permission verification is performed during installation and the application participating in the service execution process may be the same application or different applications. If the applications are different, the application participating in the service execution process is connected to the server and the Bluetooth agent module.

Optionally, when the permission verification succeeds, the method further includes: The Bluetooth agent module stores registration information of the application. The registration information indicates the Bluetooth agent module to establish the channel to the first device based on the first device identifier. Alternatively, the registration information indicates the Bluetooth agent module to notify, based on the first device identifier, the application corresponding to the first device identifier.

The registration information may include an OPTION, and the OPTION may indicate that a data receiving entity is the application. In addition, the Bluetooth chip wakes up the application after the first device identifier is obtained through scanning.

The registration information may alternatively be sent by the application to the Bluetooth agent module together with the certificate.

In a possible implementation, the method further includes: When the application is uninstalled from the electronic device, the Bluetooth agent module indicates the Bluetooth chip to stop scanning for the first device identifier.

Optionally, the Bluetooth chip may delete the stored device identifier corresponding to the application. The Bluetooth agent module may further delete the registration information of the application.

According to a second aspect, an embodiment of this application provides an electronic device, including one or more processors, a memory, a Bluetooth chip, and a Bluetooth agent module. The memory and the Bluetooth chip are coupled to the one or more processors, and the Bluetooth chip is connected to the Bluetooth agent module. The memory is configured to store computer program code, and the computer program code includes computer instructions. When the one or more processors execute the computer instructions, the electronic device is enabled to perform the Bluetooth scanning method according to any one of the first aspect or the possible implementations of the first aspect.

According to a third aspect, this application provides a computer storage medium, including computer instructions. When the computer instructions are run on an electronic device, the electronic device is enabled to perform the Bluetooth scanning method according to any one of the first aspect or the possible implementations of the first aspect.

According to a fourth aspect, an embodiment of this application provides a computer program product. When the computer program product runs on a computer, the computer is enabled to perform the Bluetooth scanning method according to any one of the first aspect or the possible implementations of the first aspect.

It may be understood that the electronic device according to the second aspect, the computer storage medium according to the third aspect, or the computer program product according to the fourth aspect are all configured to perform the Bluetooth scanning method according to any one of the first aspect or the possible implementations of the first aspect. Therefore, for beneficial effects that can be achieved, refer to beneficial effects in a corresponding method, and details are not described herein again.

BRIEF DESCRIPTION OF DRAWINGS

The following describes accompanying drawings used in embodiments of this application.

DESCRIPTION OF EMBODIMENTS

The following describes the embodiments of this application with reference to the accompanying drawings in the embodiments of this application. Terms used in implementations of the embodiments this application are merely intended to explain specific embodiments of this application, and are not intended to limit this application.

First, application scenarios related to the embodiments of this application are described. A Bluetooth function is more widely used in imperceptible services. The imperceptible services include imperceptible vehicle lock unlocking, imperceptible payment, and the like. With reference to a system architecture, the following separately uses application scenarios of the imperceptible vehicle lock unlocking and the imperceptible payment as examples to provide descriptions.

It may be understood that the embodiments of this application are not limited to the foregoing application scenarios, and may further include a service process implemented by using another Bluetooth function, for example, a Bluetooth electronic scale. This is not limited in the embodiments of this application.

Figure 1:
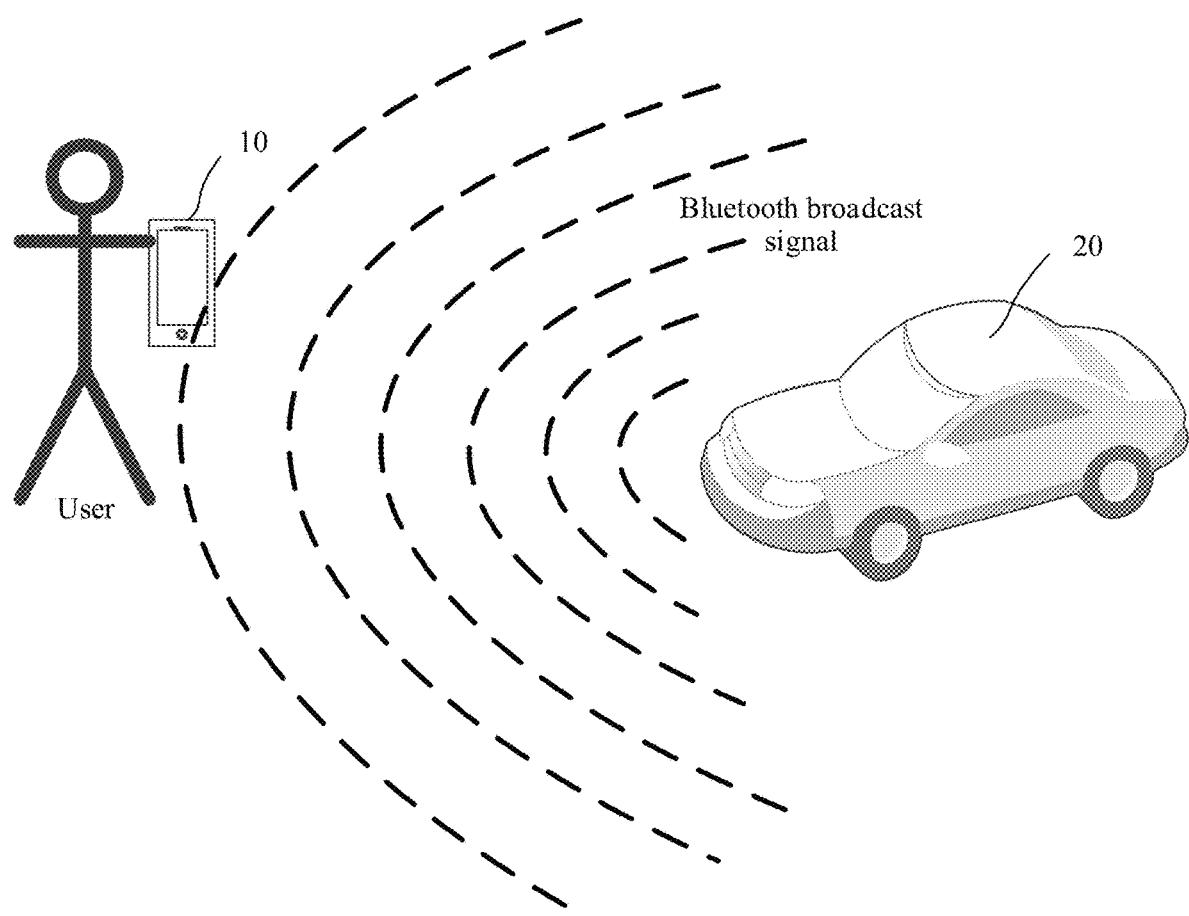
FIG. 1 is a schematic diagram of an architecture of a Bluetooth system according to an embodiment of this application.

FIG. 1 is a schematic diagram of an architecture of a Bluetooth system according to an embodiment of this application. As shown in FIG. 1, the Bluetooth system includes an electronic device 10 and a Bluetooth device 20 (for example, a vehicle 20). The vehicle 20 may broadcast a Bluetooth broadcast signal. In a process in which a user carries the electronic device 10 and moves close to the vehicle 20, the electronic device 10 may receive the Bluetooth broadcast signal. An application (application, APP) corresponding to the vehicle 20 may be installed on the electronic device 10. The APP on the electronic device 10 may establish a communication connection to the vehicle by using the Bluetooth broadcast signal, and complete security verification. After the security verification succeeds, a vehicle lock of the vehicle 20 is automatically unlocked. In the foregoing process of unlocking the vehicle lock of the vehicle 20, the vehicle lock of the vehicle 20 can be unlocked imperceptibly and automatically without the user manually operating the APP on the electronic device 10.

Figure 2:
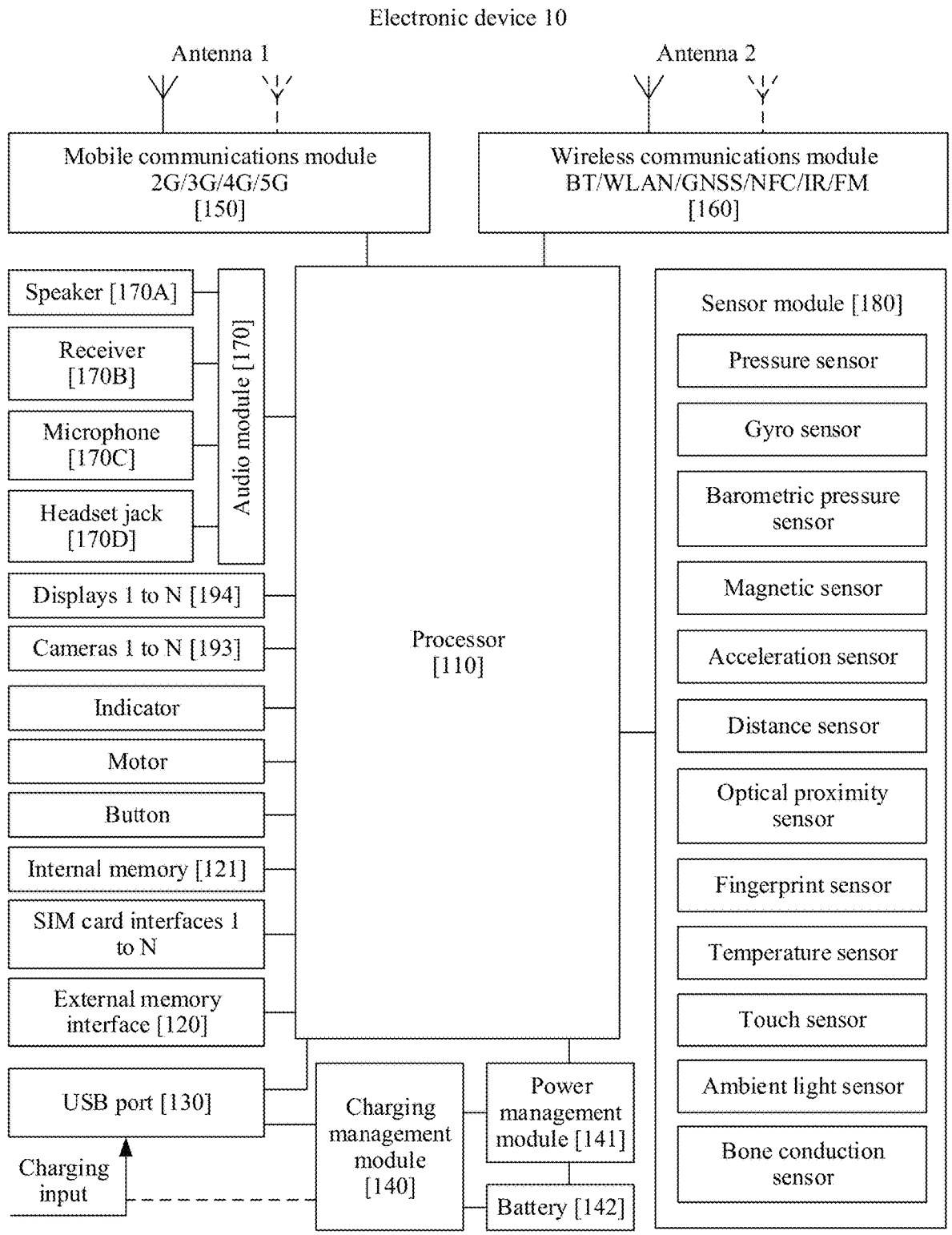
FIG. 2 is a schematic diagram of a structure of an electronic device 10 according to an embodiment of this application.

The following describes the electronic device 10 in the Bluetooth system in this embodiment of this application. FIG. 2 is a schematic diagram of a structure of the electronic device 10 according to an embodiment of this application.

The electronic device 10 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 10. In some other embodiments of this application, the electronic device 10 may include more or fewer components than those shown in the figure, or some components may be combined, or some components may be split, or there may be a different component layout. The components shown in the figure may be implemented by hardware, software, or a combination of software and hardware.

The processor 110 may include one or more processing units.

A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the electronic device 10 may be implemented through the antenna 1, the antenna 2, the mobile communications module 150, the wireless communications module 160, a modem processor, a baseband processor, and the like.

The antenna 1 and the antenna 2 are configured to transmit and receive electromagnetic wave signals. Each antenna in the electronic device 10 may be configured to cover one or more communications frequency bands.

The mobile communications module 150 may provide a solution that is applied to the electronic device 10 and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1.

The wireless communications module 160 may provide wireless communication solutions applied to the electronic device 10, including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110.

The wireless communications module 160 includes a Bluetooth chip 101 provided in the embodiments of this application, namely, a Bluetooth chip 101 shown in any one of FIG. 8 to FIG. 10 and FIG. 12A to FIG. 19.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology.

The electronic device 10 implements a display function through a GPU, the display 194, an application processor, and the like. The GPU is a microprocessor for image processing, and connects the display 194 to the application processor.

The display 194 is configured to display an image, a video, and the like.

The electronic device 10 may implement a photographing function through an ISP, the camera 193, a video codec, the GPU, the display 194, the application processor, and the like.

The ISP is configured to process data fed back by the camera 193.

The camera 193 is configured to capture a static image or a video. An optical image of an object is generated through a lens, and is projected onto a photosensitive element. The photosensitive element converts an optical signal into an electrical signal, and then transmits the electrical signal to the ISP to convert the electrical signal into a digital image signal.

The external memory interface 120 may be configured to connect to an external memory card, for example, a micro SD card, to extend a storage capability of the electronic device 10. The external storage card communicates with the processor 110 through the external memory interface 120, to implement a data storage function.

The internal memory 121 may be configured to store computer-executable program code. The executable program code includes instructions. The processor 110 runs the instructions stored in the internal memory 121 to perform various function applications of the electronic device 10 and process data. The internal memory 121 may include a program storage area and a data storage area.

The electronic device 10 may implement an audio function, for example, music playing and recording, through the audio module 170, the speaker 170A, the receiver 170B, the microphone 170C, the headset jack 170D, the application processor, and the like.

The electronic device 10 may also include various types of sensors.

A software system of the electronic device 10 may use a layered architecture, an event-driven architecture, a micro-kernel architecture, a micro service architecture, or a cloud architecture. In this embodiment of the present invention, an Android system with the layered architecture is used as an example to illustrate a software structure of the electronic device 10.

Figure 3:
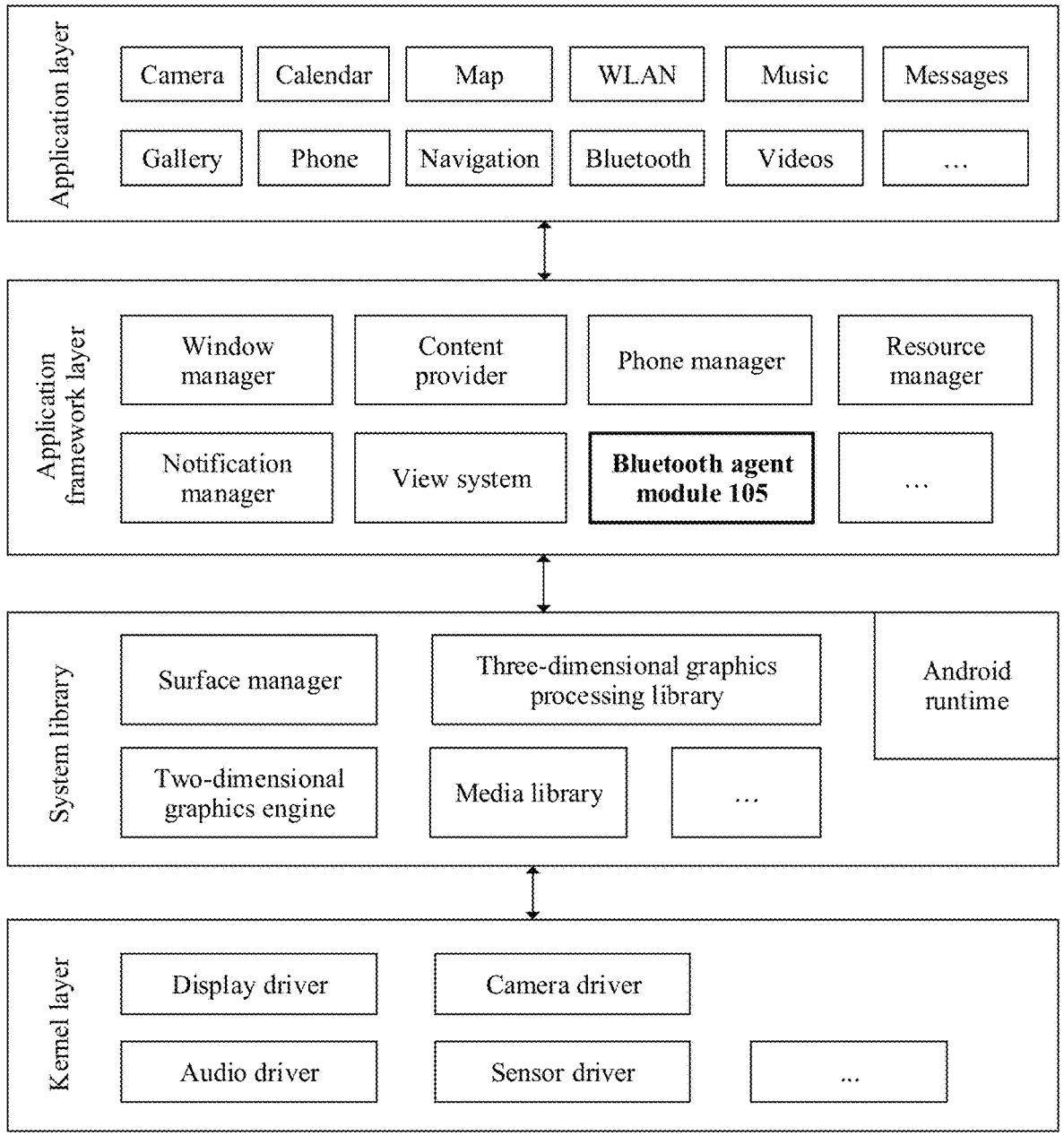
FIG. 3 is a block diagram of a software structure of an electronic device 10 according to an embodiment of this application.

FIG. 3 is a block diagram of the software structure of the electronic device 10 according to an embodiment of this application.

In a layered architecture, software is divided into several layers, and each layer has a clear role and task. The layers communicate with each other through a software interface. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 3, the application package may include applications such as "camera", "gallery", "calendar", "phone", "maps", "navigation", "WLAN", "Bluetooth", "music", "videos", and "messages".

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like. The application framework layer may further include a Bluetooth agent module 105 provided in the embodiments of this application, namely, a Bluetooth agent module 105 in any one of examples shown in FIG. 8 to FIG. 10 and FIG. 12A to FIG. 19. The Bluetooth agent module 105 may be an application/interface at the application framework layer.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, an address book, and the like.

The view system includes a visual control such as a text display control, or a picture display control. The view system may be configured to construct an application. A display interface may include one or more views.

The phone manager is configured to provide a communication function of the electronic device 10, for example, management of a call status (including answering or declining).

The resource manager provides various resources for an application, such as a localized character string, an icon, a picture, a layout file, and a video file.

The notification manager enables the application to display notification information in the status bar, and may be configured to convey a notification message. The notification manager may automatically disappear after a short pause without a user interaction. For example, the notification manager is configured to notify download completion, give a message notification, and the like. The notification manager may alternatively be a notification that appears in a top status bar of the system in a form of a graph or a scroll bar text.

The Bluetooth agent module 105 is configured to indicate a Bluetooth chip to scan for a device identifier. The Bluetooth agent module is further configured to establish a channel to an external Bluetooth device based on a first device identifier, or notify an application corresponding to an external Bluetooth device identifier.

The Android runtime includes a kernel library and a virtual machine. The Android runtime is responsible for scheduling and management of the Android system.

The kernel library includes two parts: a function that needs to be called by a java language and a kernel library of Android.

The application layer and the application framework layer run on the virtual machine.

The system library may include a plurality of function modules, for example, a surface manager (surface manager), a media library (Media Library), a three-dimensional graphics processing library (for example, OpenGL ES), and a 2D graphics engine (for example, SGL).

The kernel layer is a layer between hardware and software. The kernel layer includes at least a display driver, a camera driver, an audio driver, and a sensor driver.

Figure 4:
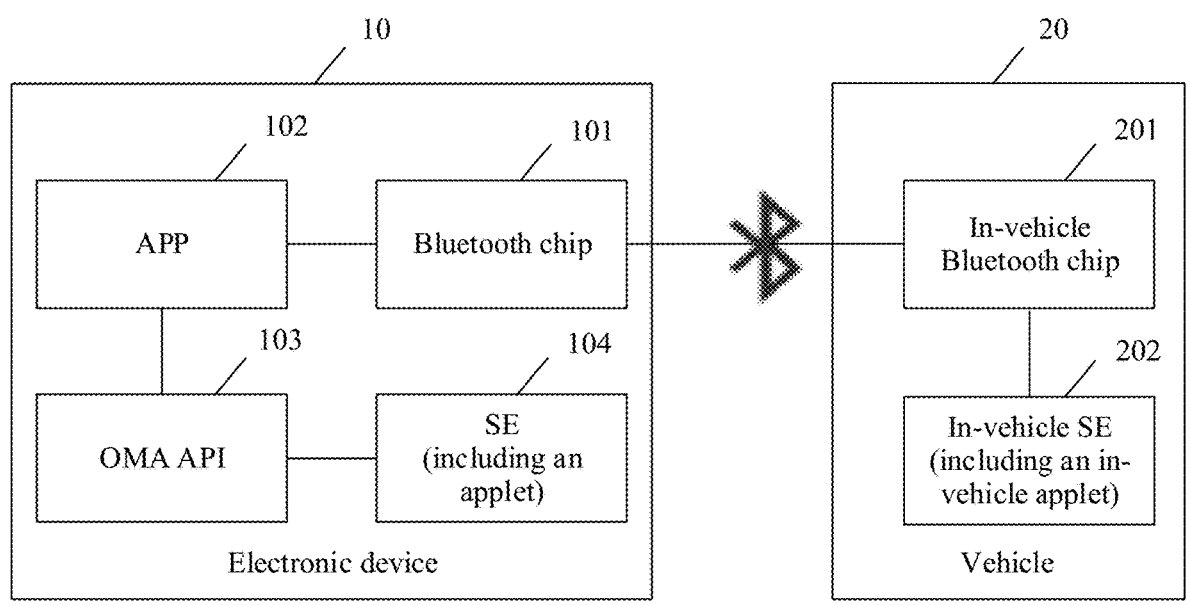
FIG. 4 is a schematic diagram of an architecture of a Bluetooth system according to the conventional technology.

The following describes a process of starting the vehicle 20 in the scenario shown in FIG. 1 with reference to structures of the electronic device 10 and the vehicle 20. FIG. 4 is a schematic diagram of an architecture of a Bluetooth system according to the conventional technology. As shown in FIG. 4, the electronic device 10 may establish a communication connection to the vehicle 20, and the communication connection may be a Bluetooth connection. Specifically, in the scenario shown in FIG. 1, in the process in which the user carries the electronic device 10 and moves close to the vehicle 20, the electronic device 10 establishes the Bluetooth communication connection to the vehicle 20.

As shown in FIG. 4, the electronic device 10 includes a Bluetooth chip 101, an APP 102, an open mobile alliance application programming interface (open mobile alliance application programming interface, OMA API) 103, and a secure element (secure element, SE) 104. The SE 104 includes an applet (applet). The vehicle 20 includes an in-vehicle Bluetooth chip 201 and an in-vehicle SE 202. The in-vehicle SE 202 includes an in-vehicle applet. The OMA API 103 is an interface for invoking the applet in the SE by using a rich execution environment (rich execution environment, REE). Alternatively, the in-vehicle Bluetooth chip 201 and the in-vehicle SE 202 may be connected through an in-vehicle OMA API. The applet of the SE 104 may include a ciphertext for unlocking. The in-vehicle SE 202 also includes a ciphertext for unlocking. The ciphertext in the applet of the SE 104 is in a one-to-one correspondence with the ciphertext in the in-vehicle SE 202.

For example, when a vehicle key service is enabled, a background server of a vehicle factory separately establishes a secure channel with the SE 104 of the electronic device 10 and the SE 202 of the vehicle 20, and separately places the same ciphertext into the SE 104 and the SE 202.

The Bluetooth chip 101 is connected to the APP 102. The APP 102 establishes a connection to the SE 104 through the OMA API 103. The in-vehicle Bluetooth chip 201 may continuously broadcast a Bluetooth broadcast signal. The Bluetooth chip 101 may detect the Bluetooth broadcast signal, and then detect whether the vehicle 20 from which the Bluetooth broadcast signal comes is a registered device. The following describes an implementation of detecting whether a device from which a Bluetooth broadcast signal comes is registered with the electronic device 10. The Bluetooth chip 101 stores device identification information of the vehicle 20 (for example, a universally unique identifier (universally unique identifier, UUID) of the vehicle 20). The Bluetooth broadcast signal broadcast by the in-vehicle Bluetooth chip 201 includes the device identification information of the vehicle 20. After receiving the Bluetooth broadcast signal, the Bluetooth chip 101 detects that the device identification information of the vehicle 20 is stored in the Bluetooth chip 101. In this case, the Bluetooth chip 101 determines that the device (the vehicle 20) from which the Bluetooth broadcast signal comes is registered with the electronic device 10.

In a possible implementation, vehicles of a same brand may have same device identification information, or vehicles of a same model may have same device identification information.

An application processor (application processor, AP) in the electronic device 10 may monitor a scanning result of the Bluetooth chip 101. The Bluetooth chip 101 detects, through scanning, that the vehicle 20 is a device registered with the electronic device 10. If the APP 102 on the electronic device 10 is in a running state, the vehicle 20 establishes a communication channel to the APP 102 on the electronic device 10. The communication channel may be used for communication between the in-vehicle Bluetooth chip 201 and the APP 102 in a service execution process.

It may be understood that the ciphertext in the electronic device 10 is not limited to being stored in the applet of the SE 104, and may alternatively be stored in another secure storage area, for example, stored in an application (trusted execution environment application, TA) in a trusted execution environment (trusted execution environment, TEE). In this case, a Bluetooth agent module 105 may establish a channel to the vehicle 20. The Bluetooth agent module 105 may obtain service information from the TEE, and send the service information to the vehicle 20 through the channel.

The vehicle 20 may send a ciphertext verification instruction to the electronic device 10 through the Bluetooth channel. After receiving the ciphertext verification instruction, the electronic device 10 sends the ciphertext in the applet of the SE 104 to the vehicle 20 through the Bluetooth connection. The vehicle 20 compares the received ciphertext with the ciphertext in the in-vehicle SE 202. If the comparison succeeds (for example, if the two ciphertexts are the same, the comparison succeeds), the vehicle lock of the vehicle 20 is unlocked.

In the foregoing process of unlocking the vehicle lock of the vehicle 20, the user needs to manually start the APP 102 and turn on a Bluetooth scanning switch. This reduces convenience of unlocking the lock of the vehicle 20. In addition, the AP in the electronic device 10 needs to monitor the scanning result of the Bluetooth chip 101. This increases power consumption and memory usage of the electronic device 10.

Figure 5:
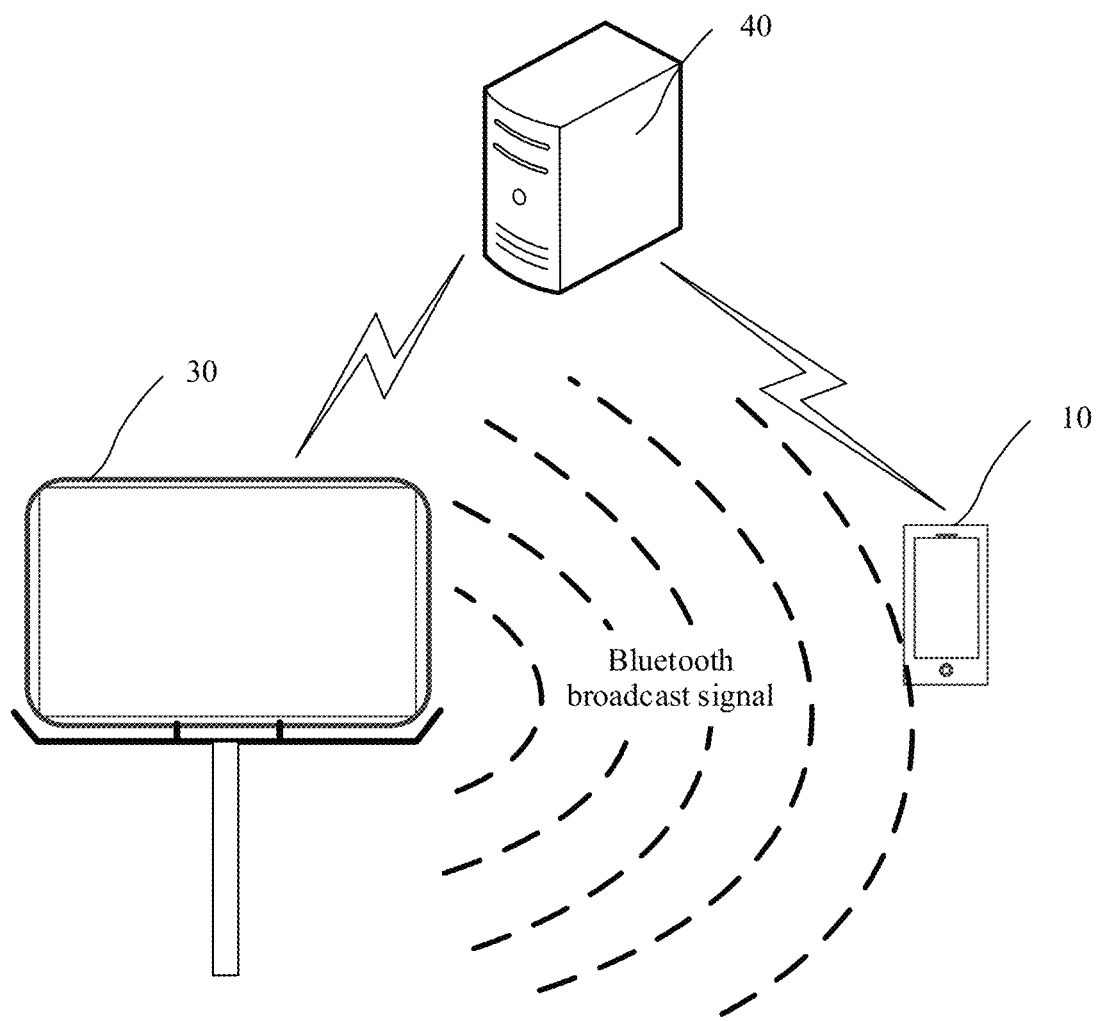
FIG. 5 is a schematic diagram of an architecture of a Bluetooth system according to an embodiment of this application.

The following describes a scenario of imperceptible payment in the embodiments of this application. FIG. 5 is a schematic diagram of an architecture of a Bluetooth system according to an embodiment of this application. As shown in FIG. 5, the Bluetooth system includes an electronic device 10, a Bluetooth device 30 (for example, a payment device 30), and a server 40.

The electronic device 10 may establish a communication connection to the server 40, and the payment device 30 may establish a communication connection to the server 40. The payment device 30 may broadcast a Bluetooth broadcast signal. When a user carries the electronic device 10 and moves close to the payment device 30, the electronic device 10 may receive the Bluetooth broadcast signal. An APP corresponding to the payment device 30 may be installed on the electronic device 10. For example, if the APP is WeChat, the server 40 is a WeChat server. When payment is required, the user faces the payment device 30, and the payment device 30 collects a facial image, and uploads the facial image to the server 40. The server 40 may complete facial verification of the user, and automatically complete a payment service process. In the foregoing facial payment process, imperceptible payment may be implemented without the user manually operating the APP on the electronic device 10.

Figure 6:
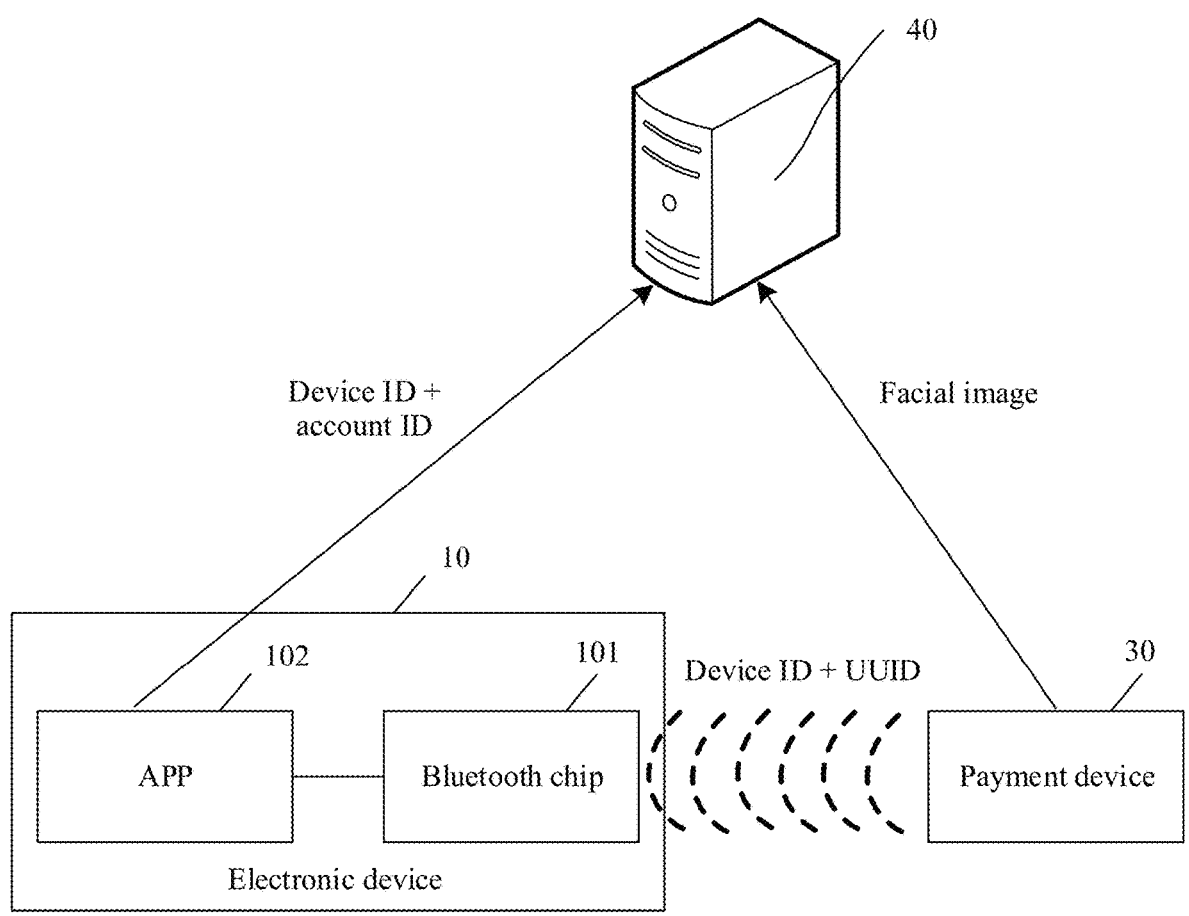
FIG. 6 is a schematic diagram of an architecture of a Bluetooth system according to the conventional technology.

The following describes a process of imperceptible payment in a scenario shown in FIG. 6 with reference to structures of the electronic device 10 and the payment device 30. FIG. 6 is a schematic diagram of an architecture of a Bluetooth system according to an embodiment of this application. As shown in FIG. 6, the electronic device 10 includes a Bluetooth chip 101 and an APP 102. The Bluetooth chip 101 is connected to the APP 102. The payment device 30 may continuously broadcast the Bluetooth broadcast signal.

Figure 7:
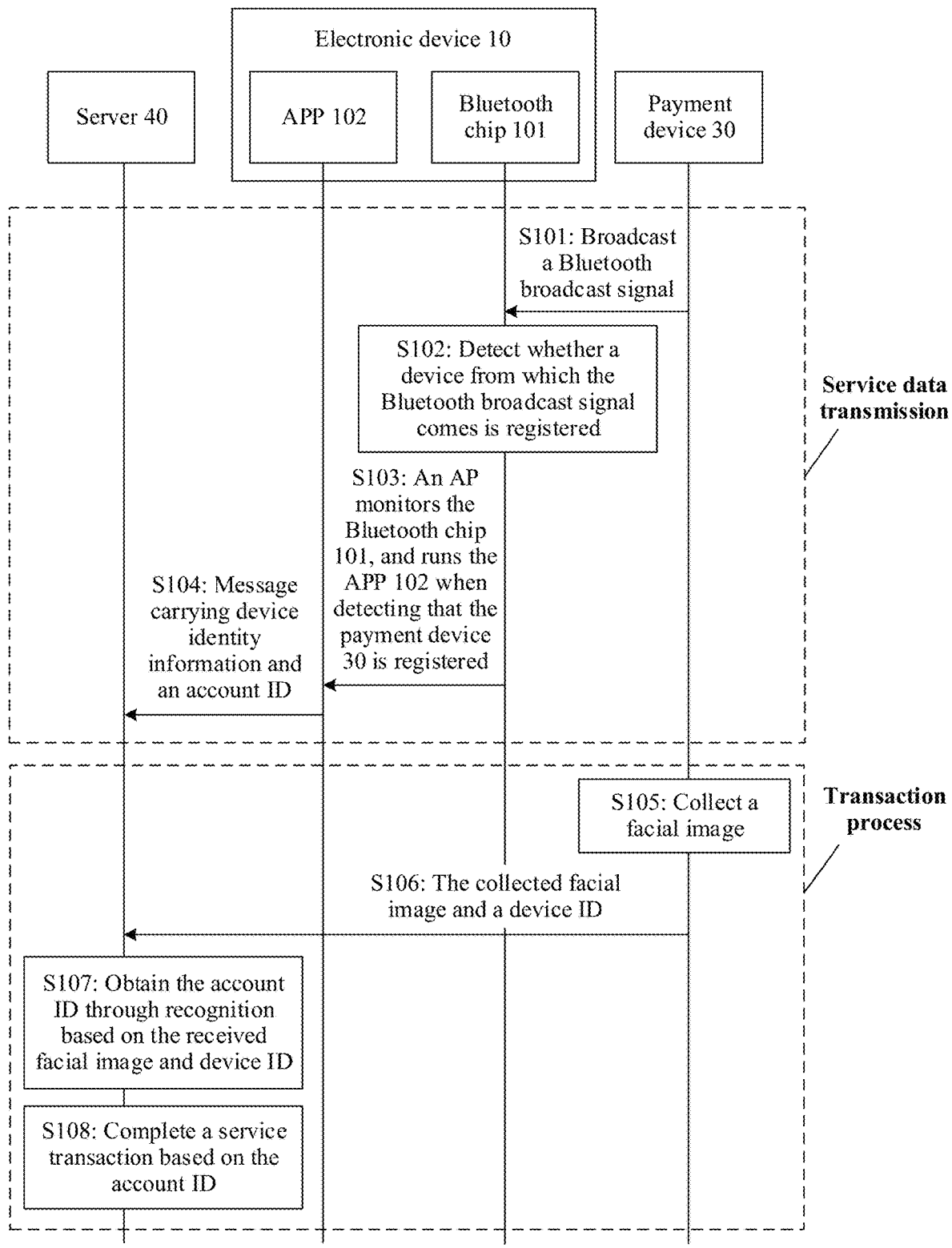
FIG. 7 is a schematic flowchart of a service transaction method according to the conventional technology.

FIG. 7 is a schematic flowchart of a service transaction method according to the conventional technology. As shown in FIG. 7, based on system architectures described in FIG. 7 and FIG. 8, the service transaction method includes steps S101 to S108.

S101: The payment device 30 broadcasts the Bluetooth broadcast signal.

The Bluetooth broadcast signal carries device identity information and device identification information (for example, a UUID). For example, the device identity information may include a device ID. The device ID may uniquely identify the payment device 30. The UUID may identify a payment device that can connect the APP 102 and the server 40. For example, for an Alipay application, payment devices that can connect the Alipay application and an Alipay server have a same UUID, and the UUID may be stored in the Bluetooth chip 101. Alternatively, a UUID of a payment device that can connect the Alipay application to the Alipay server is one of several UUIDs. The several UUIDs may be stored in the Bluetooth chip 101.

S102: The Bluetooth chip 101 receives the Bluetooth broadcast signal from the payment device 30, and detects whether the device (the payment device 30) from which the Bluetooth broadcast signal comes is registered with the electronic device 10.

For Bluetooth scanning (to be specific, detecting whether a device from which a Bluetooth broadcast signal comes is registered with the electronic device 10), refer to the specific description in the example described in FIG. 2. Details are not described herein again. The Bluetooth chip 101 may be a Bluetooth low energy (Bluetooth low energy, BLE) chip. In this case, the Bluetooth chip 101 can perform step S102 only when a Bluetooth scanning switch on the electronic device 10 is turned on.

S103: An application processor of the electronic device 10 monitors the Bluetooth chip 101, and runs the APP 102 when detecting that the device (the payment device 30) from which the Bluetooth broadcast signal comes is registered with the electronic device 10.

After detecting that the device from which the Bluetooth broadcast signal comes is registered, the application processor may detect whether the APP 102 is run. If the APP 102 is not run, step S104 is performed to run the APP 102. For a system with a release later than Android 8.0, the AP of the electronic device 10 may automatically run the APP 102 by performing step S103.

S104: The APP 102 sends a message carrying the device identity information and an account ID to the server 40.

The APP may send a message carrying the device ID and the account ID to the server 40. The device ID may be obtained by the Bluetooth chip 101 from the Bluetooth broadcast signal and sent to the APP 102. The server 40 may obtain one or more account IDs that can receive the Bluetooth broadcast signal from the payment device 30. For example, there are currently 10 electronic devices near the payment device 30, the Alipay application is installed on each of the 10 electronic devices, and an imperceptible payment service is enabled. Each of the Alipay applications on the 10 electronic devices has an Alipay account ID (for example, an Alipay account). In this case, for each of the 10 electronic devices, service information (for example, device identity information) from an external Bluetooth device 51 may be transmitted to the APP 102 by using steps S101 to S104, and the APP 102 transmits the service information to the server 40. The server 40 may obtain the Alipay account ID on each of the 10 electronic devices. In steps S105 to S108, facial comparison is performed to determine which Alipay account ID to execute a transaction process.

S105: The payment device 30 collects a facial image.

S106: The payment device 30 sends the collected facial image and the device ID to the server 40.

The device ID is in a one-to-one correspondence with the payment device 30.

S107: The server 40 obtains an account ID through recognition based on the received facial image and device ID.

After receiving the facial image and the device ID, the server 40 may determine, based on the device ID, an account ID of the uploaded service information (for example, the device identity information). For example, in the foregoing example, the server 40 may determine 10 Alipay account IDs based on device IDs to upload service information (for example, device identity information) to the server 40 through the payment device 30. The server 40 may obtain a facial image corresponding to each of the 10 Alipay account IDs. Then, the facial image received from the payment device 30 is compared with the 10 facial images, to obtain an Alipay account ID corresponding to the received facial image.

The server 40 may store an account ID and a corresponding facial image, and the facial image may be prestored by the user. The facial image corresponding to the account may alternatively be obtained by the server 40 from another device (for example, the electronic device 10). This is not limited in this embodiment of this application.

S108: The server 40 completes a service transaction based on the account ID.

The server 40 may use the account ID obtained in step S107 as a deduction account to complete the service transaction.

In the foregoing process of imperceptible payment, in step S102, the application processor of the electronic device 10 needs to be always in a working state in a Bluetooth scanning process, to monitor whether a device from which a Bluetooth broadcast signal comes is registered with the electronic device 10. This increases power consumption and memory usage of the electronic device 10. In addition, the Bluetooth scanning switch, on the electronic device 10, that is used to start Bluetooth scanning is turned off by default. This affects Bluetooth scanning, and reduces convenience of the payment process.

Figure 8:
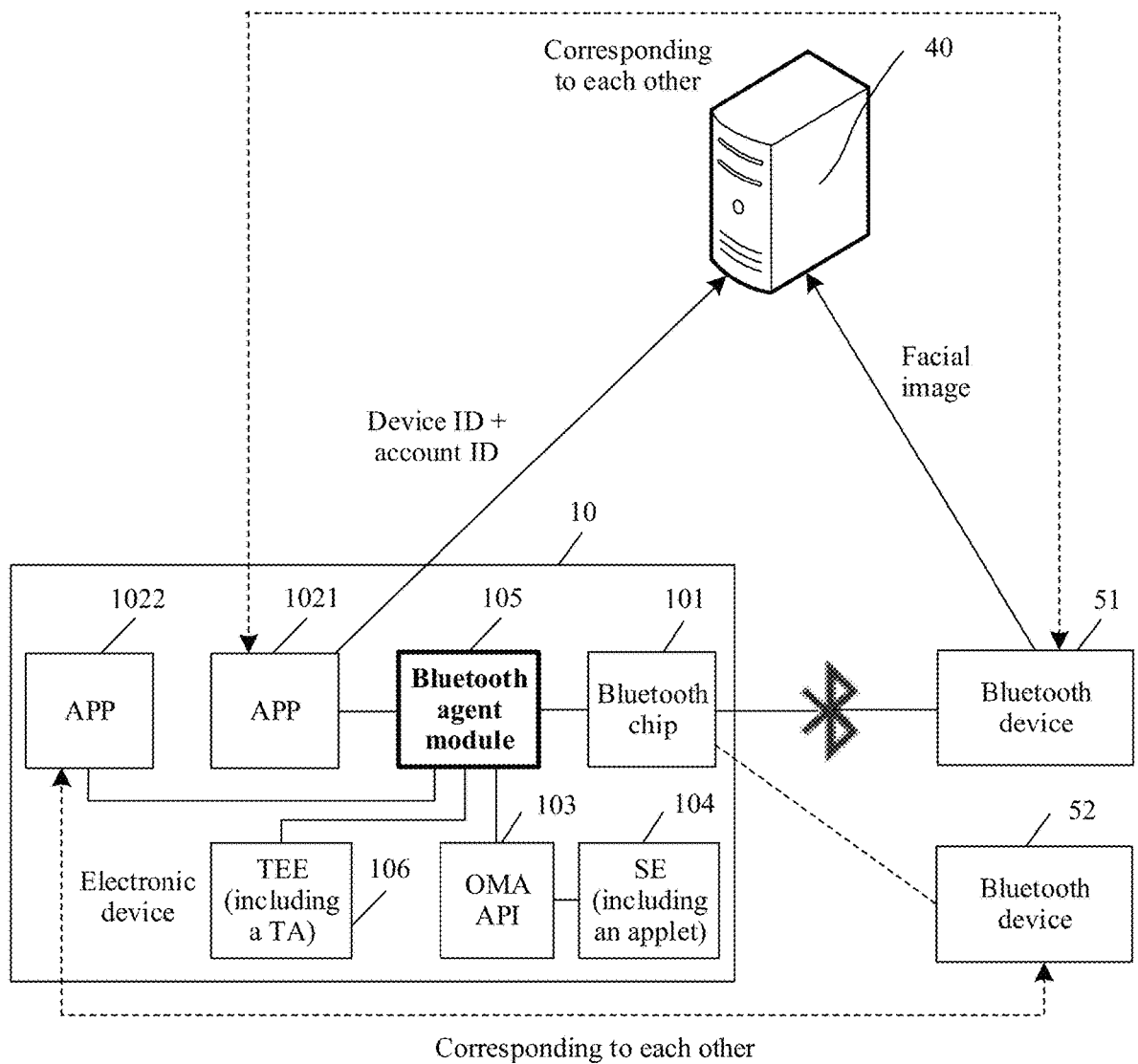
FIG. 8 is a schematic diagram of an architecture of a Bluetooth system according to an embodiment of this application.

The embodiments of this application provide a service execution method, to improve convenience of a service execution process, and reduce power consumption and memory usage of the electronic device 10. The electronic device 10 involved in the service execution method includes a Bluetooth agent (Bluetooth agent) module. FIG. 8 is a schematic diagram of an architecture of a Bluetooth system according to an embodiment of this application. As shown in FIG. 8, the Bluetooth system includes an electronic device 10, a Bluetooth device 50 (for example, a vehicle or a payment device), and a server 40.

As shown in FIG. 8, the electronic device 10 includes a Bluetooth chip 101, an APP 102, an OMA API 103, an SE 104, a Bluetooth agent module 105, a TEE 106, an APP 1021, and an APP 1022. The APP 1021 and the APP 1022 may be different service applications (for example, one is a payment application and the other is an application associated with a vehicle 20). Each of the APP 1021 and the APP 1022 corresponds to a Bluetooth device. For example, the APP 1021 corresponds to a Bluetooth device 51, and the APP 1022 corresponds to a Bluetooth device 52.

In this embodiment of this application, an application on which permission verification is performed during installation and an application participating in a service execution process may be the same APP or different APPs. If the APPs are different, the APP participating in the service execution process is connected to the server 40 and the Bluetooth agent module.

There may be a plurality of Bluetooth devices corresponding to the APP 1021. Device identification information of a Bluetooth device is stored in the Bluetooth agent module 105 and the Bluetooth chip 101, and the Bluetooth device corresponds to one APP on the electronic device 10. There may also be a plurality of Bluetooth devices corresponding to the APP 1022. For example, an Alipay application may correspond to a plurality of payment devices, and the service execution process may be completed on the plurality of payment devices.

For descriptions of the Bluetooth chip 101, the OMA API 103, the SE 104, and the TEE 106, refer to the example shown in FIG. 2. For the APP 1021, the APP 1022, and the server 40, refer to the example shown in FIG. 6.

This embodiment of this application is described by using an example in which the APP 1021 is a payment application and the Bluetooth device 51 is a payment device corresponding to the APP 1021, and an example in which the APP 1022 is a vehicle application and the Bluetooth device 52 is a vehicle corresponding to the APP 1022.

The Bluetooth agent module 105 is connected to the APP 1022. The Bluetooth agent module 105 is further connected to the TEE 106, and the Bluetooth agent module 105 is further connected to the SE 104 through the OMA API 103.

In a vehicle lock unlocking scenario, the Bluetooth agent module 105 is started when the Bluetooth chip 101 detects that a device from which a Bluetooth broadcast signal comes is registered with the electronic device 10. The Bluetooth agent module 105 may establish a channel to an external Bluetooth device, and the Bluetooth agent module 105 is connected to the SE 104, so that service information (for example, a ciphertext) in the SE 104 may be transmitted to the external Bluetooth device (for example, a vehicle). The Bluetooth agent module 105 is further connected to the TEE 106, so that service information (for example, a ciphertext) in the TEE 106 may also be transmitted to the external Bluetooth device (for example, the vehicle).

In a payment scenario, the Bluetooth chip 101 is connected to the Bluetooth agent module 105, the Bluetooth agent module 105 is connected to the APP 1021, and the APP 1021 establishes a communication connection to the server 40. The Bluetooth device 51 establishes a communication connection to the server 40. In this service method, when the Bluetooth chip 101 obtains a first device identifier in device identifiers through scanning, the Bluetooth chip 101 notifies the Bluetooth agent module 105. The Bluetooth agent module 105 may wake up the APP 1021, and service information (for example, a device ID of the Bluetooth device 51) from the external Bluetooth device 51 may be transmitted to the APP 1021. The APP 1021 establishes the communication connection to the server 40, so that the service information (for example, the device ID of the Bluetooth device 51) from the external Bluetooth device 51 is transmitted to the server 40. The server 40 may complete a service based on the service information transmitted from the APP 1021 and user information (for example, a facial image) collected from the Bluetooth device 51. A device identifier stored in the Bluetooth chip 101 is a device identifier corresponding to an application on which verification succeeds. In other words, verification on an application, corresponding to the first device identifier, on the electronic device 10 succeeds.

The Bluetooth agent module 105 is started only when the Bluetooth chip 101 obtains the first device identifier in the device identifiers through scanning. The Bluetooth agent module 105 and an application processor in the electronic device 10 do not need to be always in a working state, to reduce power consumption and memory usage of the electronic device 10.

In this embodiment of this application, the Bluetooth agent module may run the APP, and a user does not need to manually run the APP. In this way, an execution process is imperceptible to the user, and convenience of the service execution process is improved.

In this embodiment of this application, the Bluetooth agent module 105 may run the APP 1021, but the APP 1021 does not need to be always run on the electronic device 10, and the APP 1021 may be stopped running by the application processor, to further reduce power consumption and memory usage of the electronic device 10.

In this embodiment of this application, the Bluetooth agent module 105 further provides a Bluetooth scanning management platform for a Bluetooth-related service execution process.

The Bluetooth agent module 105 is connected to the SE 104, and directly establishes a Bluetooth channel between the Bluetooth chip 101 and a Bluetooth device 60 without running the APP 1022, to further reduce power consumption and memory usage of the electronic device 10.

Optionally, the APP 1022 may further be connected to the TEE 106. In this case, the Bluetooth agent module 105 may wake up the APP 1022. The APP 1022 may obtain the service information (for example, the ciphertext) from the TEE 106 and transmit the service information to the Bluetooth agent module 105. The Bluetooth agent module 105 establishes the channel to the external Bluetooth device, and sends the service information to the external Bluetooth device (for example, the vehicle). The external Bluetooth device may execute a corresponding service, for example, unlock a vehicle key, based on the service information.

Optionally, the APP 1022 may further be connected to the SE 104 through an OMA API. In this case, the Bluetooth agent module 105 may wake up the APP 1022, and the APP 1022 may obtain the service information (for example, the ciphertext) from the SE 104 and transmit the service information to the Bluetooth agent module 105. The Bluetooth agent module 105 establishes the channel to the external Bluetooth device (for example, the vehicle), and sends the service information to the external Bluetooth device (for example, the vehicle). The external Bluetooth device may execute a corresponding service, for example, unlock the vehicle key, based on the service information.

The following describes examples of the service execution method provided in the embodiments of this application. Examples of service execution processes in the following scenarios are separately described: (1) imperceptible facial payment; (2) imperceptible vehicle lock unlocking; and (3) automatically uploading data of a weight scale.

(1) Imperceptible Facial Payment

This service execution method is based on the system architecture described in FIG. 5. For example, the service execution process is to perform imperceptible facial payment. A Bluetooth device 50 may be the payment device 30 shown in FIG. 5. It may be understood that in this embodiment of this application, the scenario of imperceptible facial payment is used as an example for description, and another service scenario may alternatively be used. This is not limited in this embodiment of this application.

Figure 9:
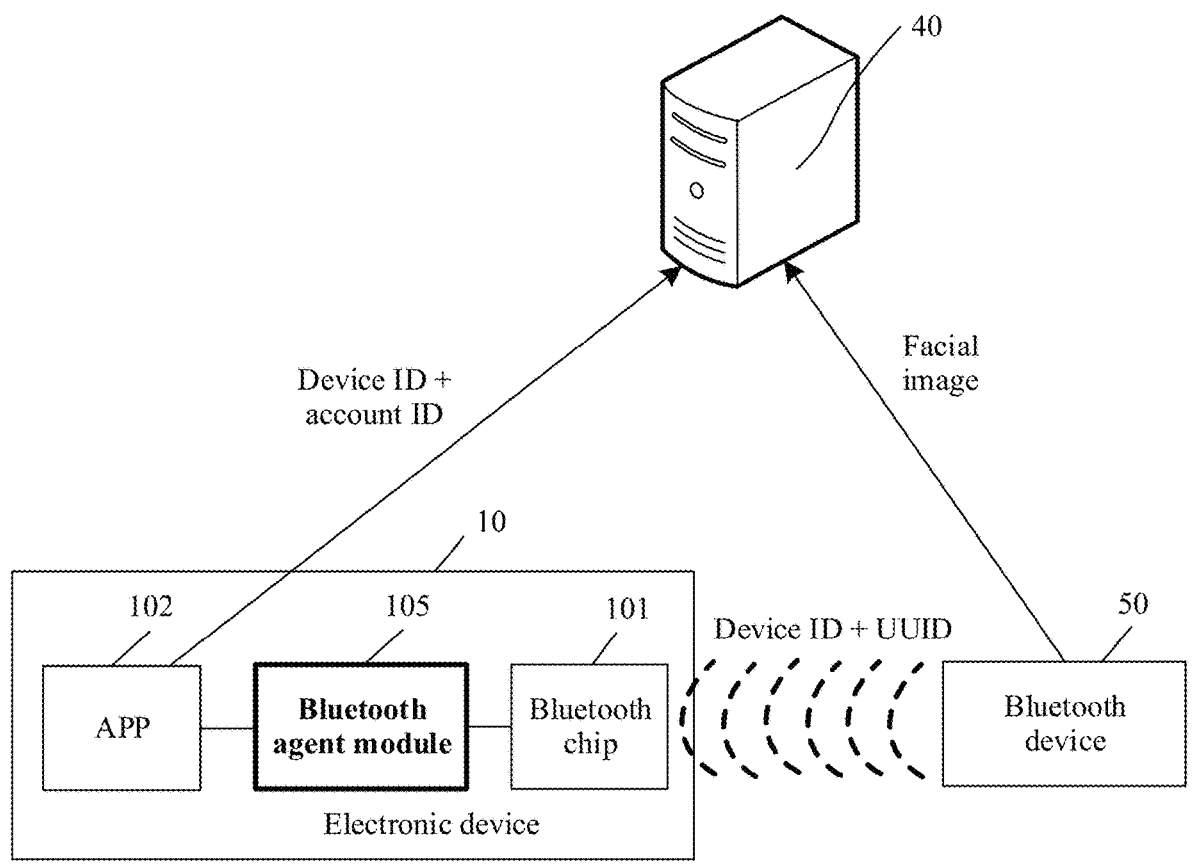
FIG. 9 is a schematic diagram of an architecture of a Bluetooth system according to an embodiment of this application.

FIG. 9 is a schematic diagram of an architecture of a Bluetooth system according to an embodiment of this application. As shown in FIG. 9, the Bluetooth system includes an electronic device 10, the Bluetooth device 50 (for example, the payment device 30), and a server 40. As shown in FIG. 9, the electronic device 10 includes a Bluetooth chip 101, a Bluetooth agent module 105, and an APP 102. The Bluetooth chip 101 establishes a connection to the Bluetooth agent module 105, and the Bluetooth agent module 105 establishes a connection to the APP 102.

Before the system architecture is used to perform imperceptible facial payment, a user needs to install the APP 102 on the electronic device 10, and the electronic device 10 completes a registration process. The following processes are separately described: (a) the registration process; (b) a transaction process; and (c) a deregistration process.

(a) Registration Process

Figure 10:
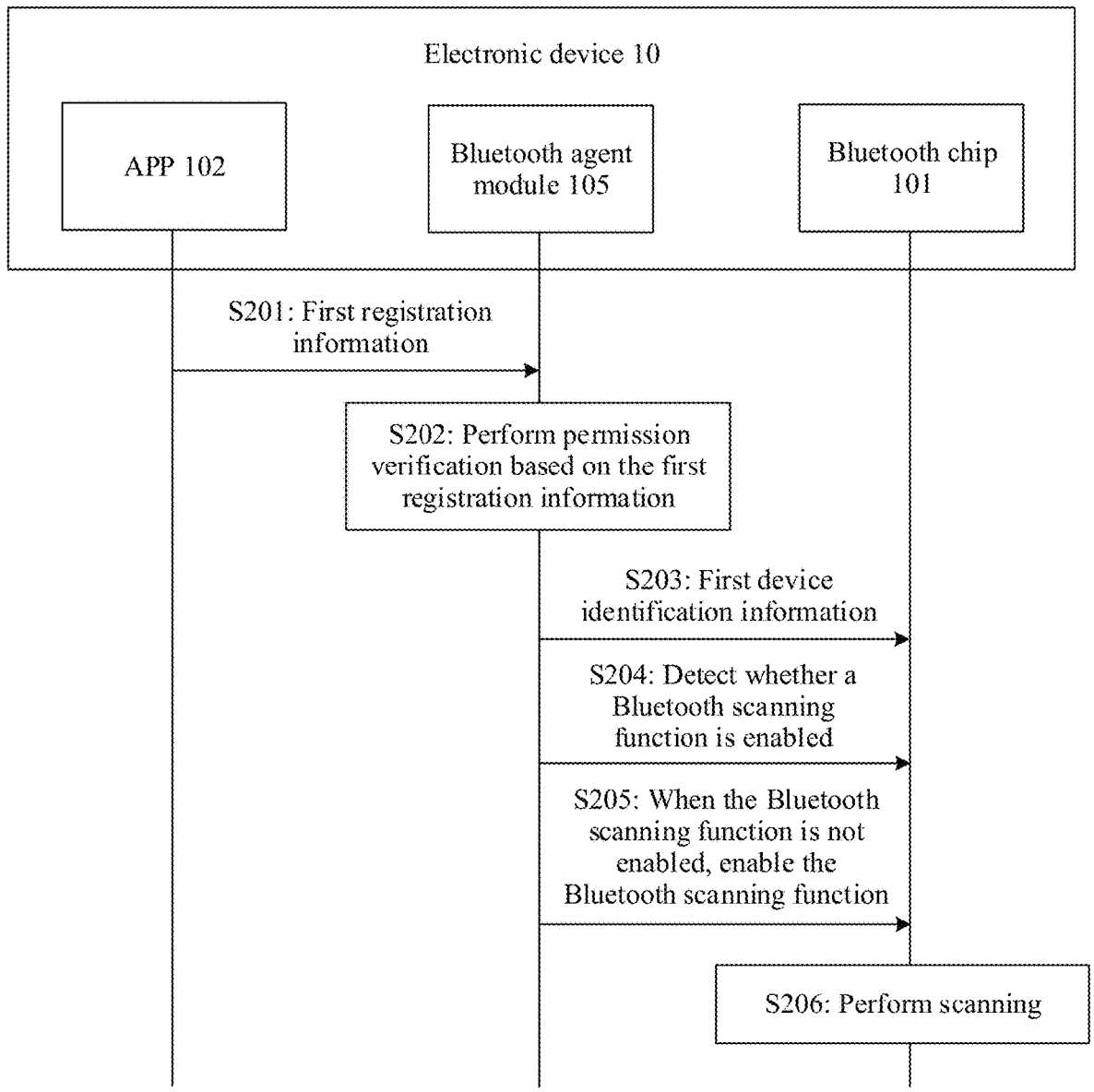
FIG. 10 is a schematic flowchart of a registration process of an APP 102 according to an embodiment of this application.

The following describes the registration process with reference to the system architecture shown in FIG. 9 and a process shown in FIG. 10. FIG. 10 is a schematic flowchart of the registration process of the APP 102 according to an embodiment of this application. The registration process of the APP 102 includes steps S201 to S206.

S201: When the APP 102 is installed on the electronic device 10, the APP 102 sends first registration information to the Bluetooth agent module 105.

The first registration information may include one or more of the following:

① APP_ID: an identification (identification, ID) of the APP 102 on which registration is performed.

② APP_AWAKE_ID: an ID used to wake up the APP 102 after the Bluetooth chip 101 obtains first device identification information through scanning.

③ CORRESPONDENT_ID: an ID of a communicator during service information transmission.

For example, the ID of the communicator may be the ID of the APP 102. In this case, the APP 102 may be woken up when a Bluetooth broadcast signal is detected through scanning. For another example, the ID of the communicator may alternatively be a UUID of a TA. In this case, when a Bluetooth broadcast signal is detected through scanning, the APP 102 may be woken up to establish a channel to an external Bluetooth device. For another example, the ID of the communicator may alternatively be an applet identification (applet identification, AID). In this case, when a Bluetooth broadcast signal is detected through scanning, the APP 102 may be woken up to establish a channel to an external Bluetooth device.

④ The first device identification information: identification information of a Bluetooth device that the APP 102 expects to scan, where for example, the identification information includes but is not limited to a UUID of the external Bluetooth device.

In a possible implementation, the APP 102 corresponds to one UUID list. The UUID list includes one or more UUIDs. For each UUID in the UUID list, the Bluetooth agent module 105 verifies a Bluetooth broadcast signal broadcast by an external Bluetooth device corresponding to the UUID.

⑤ OPTION: an entity that receives service information, such as the APP 102, a TA in a TEE 106, or an applet in an SE 104; and whether the Bluetooth chip 101 wakes up the APP 102 after obtaining the first device identification information through scanning.

S202: The Bluetooth agent module 105 performs permission verification on the APP 102 based on the first registration information.

In a possible implementation, the Bluetooth agent module 105 may store APP_IDs of a plurality of APPS, and the plurality of APP_IDs are approved by the Bluetooth agent module 105. The Bluetooth agent module 105 detects whether an APP_ID in the first registration information is included in the stored plurality of APP_IDs. If the APP_ID in the first registration information is included in the stored plurality of APP_IDs, the permission verification succeeds, and step S203 is performed. If the APP_ID in the first registration information is not included in the stored plurality of APP_IDs, the permission verification fails, and the process ends.

It may be understood that the foregoing example of the permission verification process is merely used to explain this embodiment of this application, and should not constitute a limitation. The Bluetooth agent module 105 may alternatively have another permission verification method. This is not limited in this embodiment of this application.

In this embodiment of this application, the Bluetooth agent module 105 may be located at an application framework layer in the example shown in FIG. 7, and may be an application/interface at the application framework layer. The Bluetooth agent module 105 is not limited to being located at the application framework layer, and may be located at another layer.

S203: When the permission verification succeeds, the Bluetooth agent module 105 sends the first device identification information to the Bluetooth chip 101.

The Bluetooth chip 101 may store the device identification information whose permission verification succeeds. For example, permission verification performed by the Bluetooth agent module 105 on an APP 1 succeeds, and registration information of the APP 1 includes a UUID 1, a UUID 2, a UUID 3, and a UUID 4. Permission verification performed by the Bluetooth agent module 105 on an APP 2 succeeds, and registration information of the APP 2 includes a UUID 5 and a UUID 6. In this case, the Bluetooth chip 101 may receive and store the UUID 1, the UUID 2, the UUID 3, the UUID 4, the UUID 5, and the UUID 6.

It may be understood that in this embodiment of this application, an example in which the device identification information is a UUID is used for description. However, the device identification information is not limited to the UUID, and may alternatively be other device information.

In a possible implementation, when the permission verification succeeds, the Bluetooth agent module 105 stores the first registration information of the APP 102. The Bluetooth agent module 105 may find, by using the first registration information and a UUID that is obtained by the Bluetooth chip 101 through scanning, a corresponding APP, TA, or applet.

S204: The Bluetooth agent module 105 detects whether a Bluetooth scanning function of the Bluetooth chip 101 is enabled.

When the Bluetooth scanning function of the Bluetooth chip 101 is enabled, the Bluetooth chip 101 may receive a Bluetooth broadcast signal, and detect whether device identification information carried in the Bluetooth broadcast signal is stored in the Bluetooth chip 101. When the Bluetooth scanning function of the Bluetooth chip 101 is disabled, the Bluetooth chip 101 cannot receive a Bluetooth broadcast signal.

S205: When detecting that the Bluetooth scanning function of the Bluetooth chip 101 is not enabled, the Bluetooth agent module 105 enables the Bluetooth scanning function.

For example, if the Bluetooth chip 101 is a BLE Bluetooth chip, EnableBLE may be invoked to enable the Bluetooth scanning function.

Figure 11A:
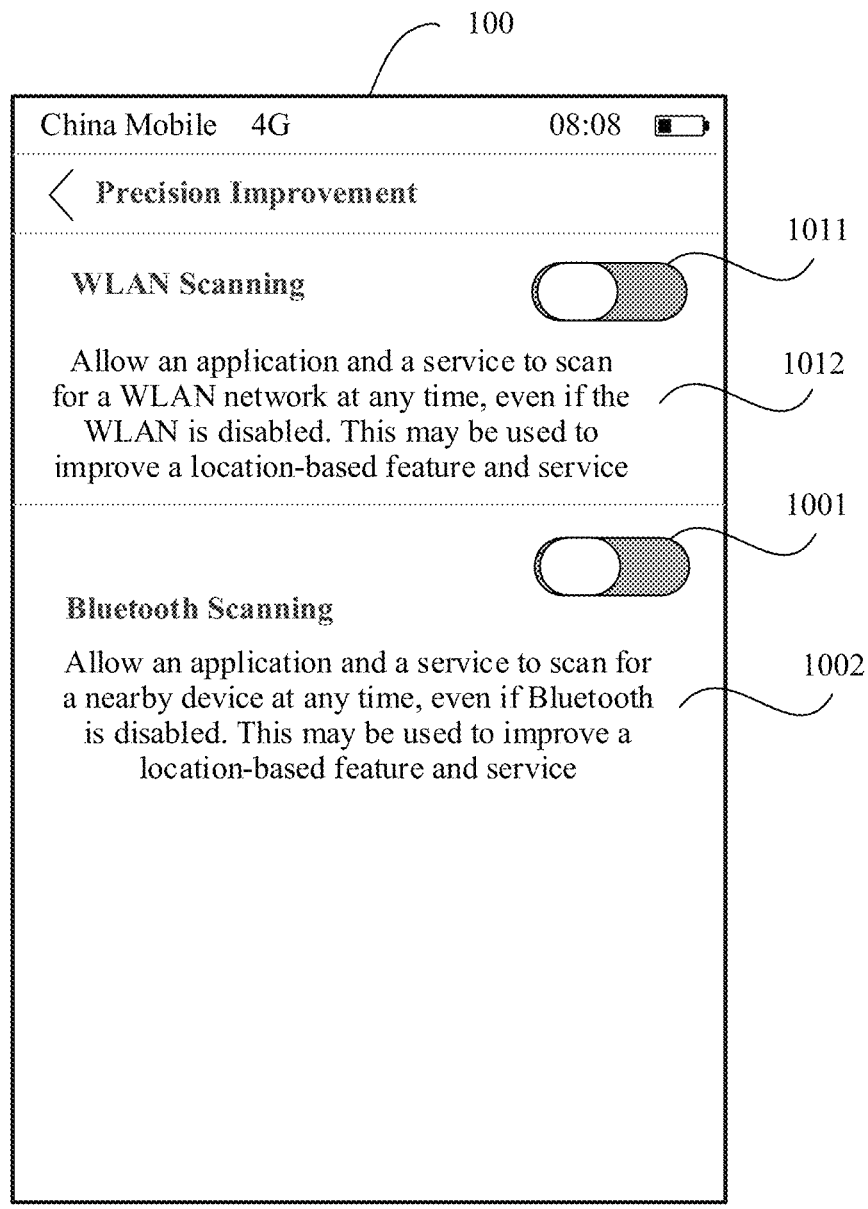
FIG. 11(a), FIG. 11(b1), and FIG. 11(b2) are schematic diagrams of an application interface according to an embodiment of this application.
Figure 11:
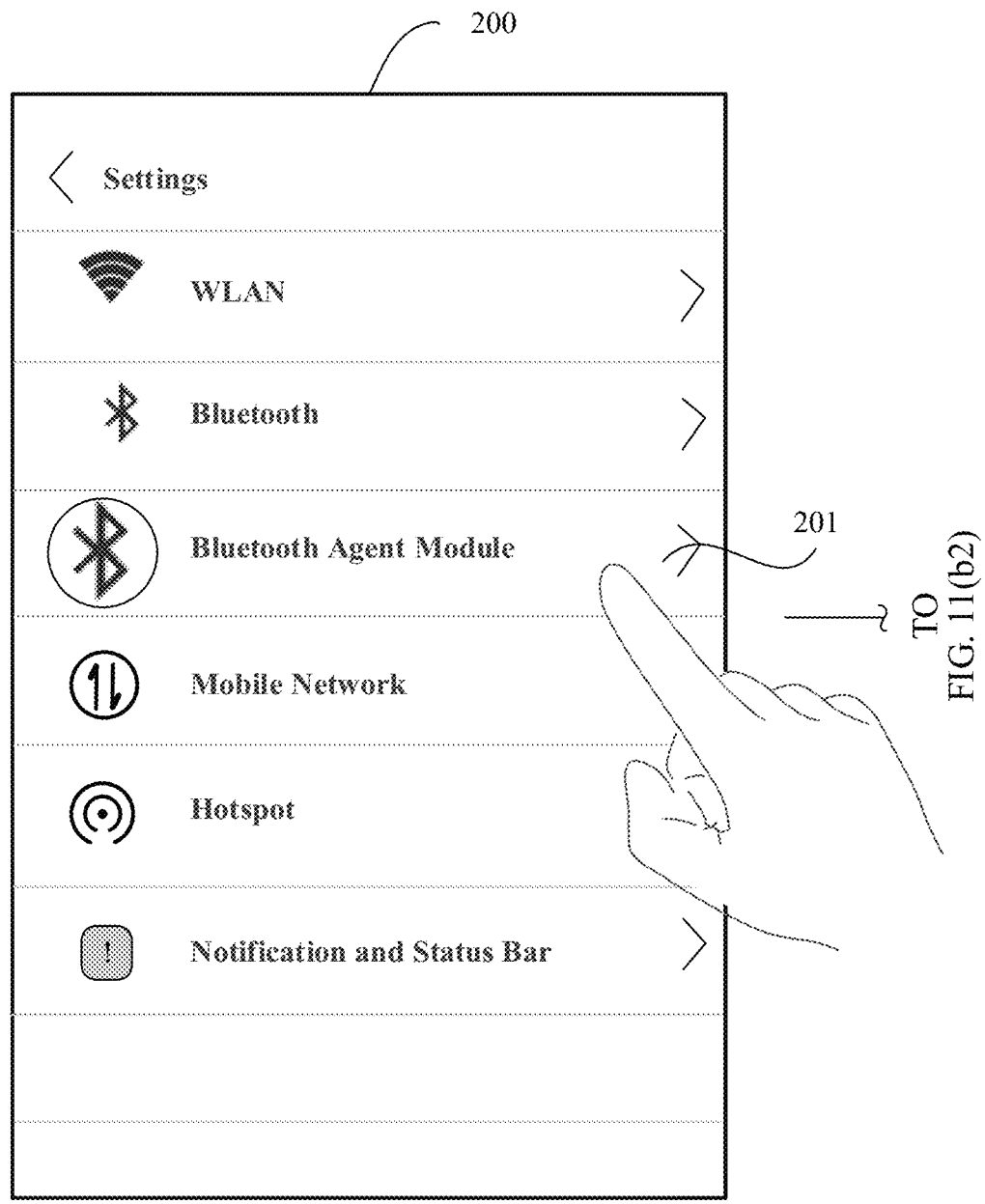
Figure 11:
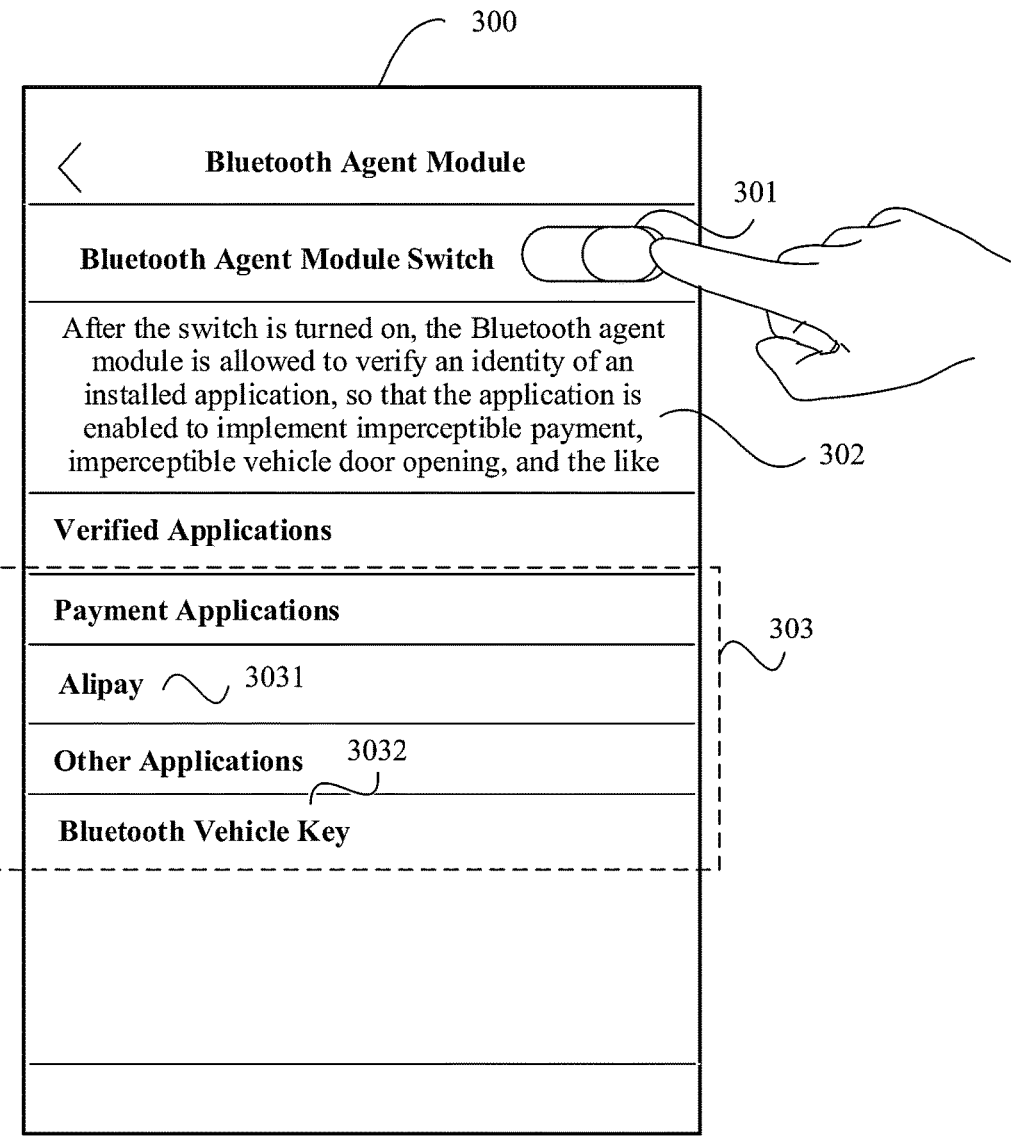

FIG. 11(*a*), FIG. 11(*b*1), and FIG. 11(*b*2) are schematic diagrams of an application interface according to an embodiment of this application. An application interface 100 is an application interface in a system setting application. As shown in FIG. 11(*a*), the application interface 100 includes a Bluetooth scanning switch 1001, a Bluetooth scanning prompt 1002, a WLAN scanning switch 1011, and a WLAN scanning prompt 1012.

When the Bluetooth scanning switch 1001 is in an on state, the Bluetooth scanning function is enabled. When the Bluetooth scanning switch 1001 is in an off state, the Bluetooth scanning function is disabled. When the Bluetooth scanning switch 1001 is in the off state, the Bluetooth scanning switch 1001 may be changed to the on state by using step S105, to enable the Bluetooth scanning function.

As shown in FIG. 11(*a*), the Bluetooth scanning prompt 1002 prompts that an application and a service are allowed to scan for a nearby device at any time, even if Bluetooth is disabled. This may be used to improve a location-based feature and service. When Bluetooth is disabled and the Bluetooth scanning switch 1001 is turned on, the Bluetooth chip 101 can still perform scanning in step S206.

When the WLAN scanning switch 1011 is in an on state, a WLAN scanning function is enabled. When the WLAN scanning switch 1011 is in an off state, the WLAN scanning function is disabled. The WLAN scanning prompt 1012 prompts that an application and a service are allowed to scan for a WLAN network at any time, even if the WLAN is disabled. This may be used to improve a location-based feature and service.

S206: The Bluetooth chip 101 performs scanning.

In the scanning process, the Bluetooth chip 101 may receive a Bluetooth broadcast signal, and detect whether a UUID carried in the Bluetooth broadcast signal is stored in the Bluetooth chip 101.

By using steps S201 to S206, registration of the APP 102 on the electronic device 10 is completed. After the registration is completed, the electronic device 10 may log in to an account on the APP 102 in response to a user operation. For example, for an Alipay application, after registration is completed, the electronic device 10 may log in to an Alipay account on the Alipay application in response to a user operation. The Alipay account may be an account ID of the Alipay application on the electronic device 10. In a process of logging in to the account, for example, an account password corresponding to the account ID needs to be verified.

In some possible implementations, a setting interface on the electronic device 10 may include a setting entry of the Bluetooth agent module. As shown in FIG. 11(b1), a setting interface 200 includes a setting entry 201 of the Bluetooth agent module. In response to a user operation performed by the user on the setting entry 201 of the Bluetooth agent module, for example, a tapping operation, the electronic device 10 displays a Bluetooth agent module setting interface 300. As shown in FIG. 11(b2), the Bluetooth agent module setting interface 300 includes a Bluetooth agent module switch 301, a switch indication 302, and a list 303 of registered applications. Details are as follows:

In response to a tap operation performed by the user on the Bluetooth agent module switch 301, the Bluetooth agent module may perform permission verification on the application to complete application registration, that is, perform steps S201 to S206.

The switch indication 302 may indicate a function of the Bluetooth agent module switch 30. To be specific, after the switch is turned on, the Bluetooth agent module is allowed to verify an identity of an installed application, so that the application is enabled to implement imperceptible payment, imperceptible vehicle lock unlocking, and the like.

The list 303 of registered applications may include an identifier of an application that is registered with the electronic device 10 by using steps S201 to S206. For example, the list 303 of registered applications includes an Alipay identifier 3031 and a Bluetooth vehicle key identifier 3032. Optionally, application identifiers in the list 303 of registered applications may be classified and displayed based on an application category, for example, classified as a payment application and another application.

(b) Transaction Process

Figure 12A:
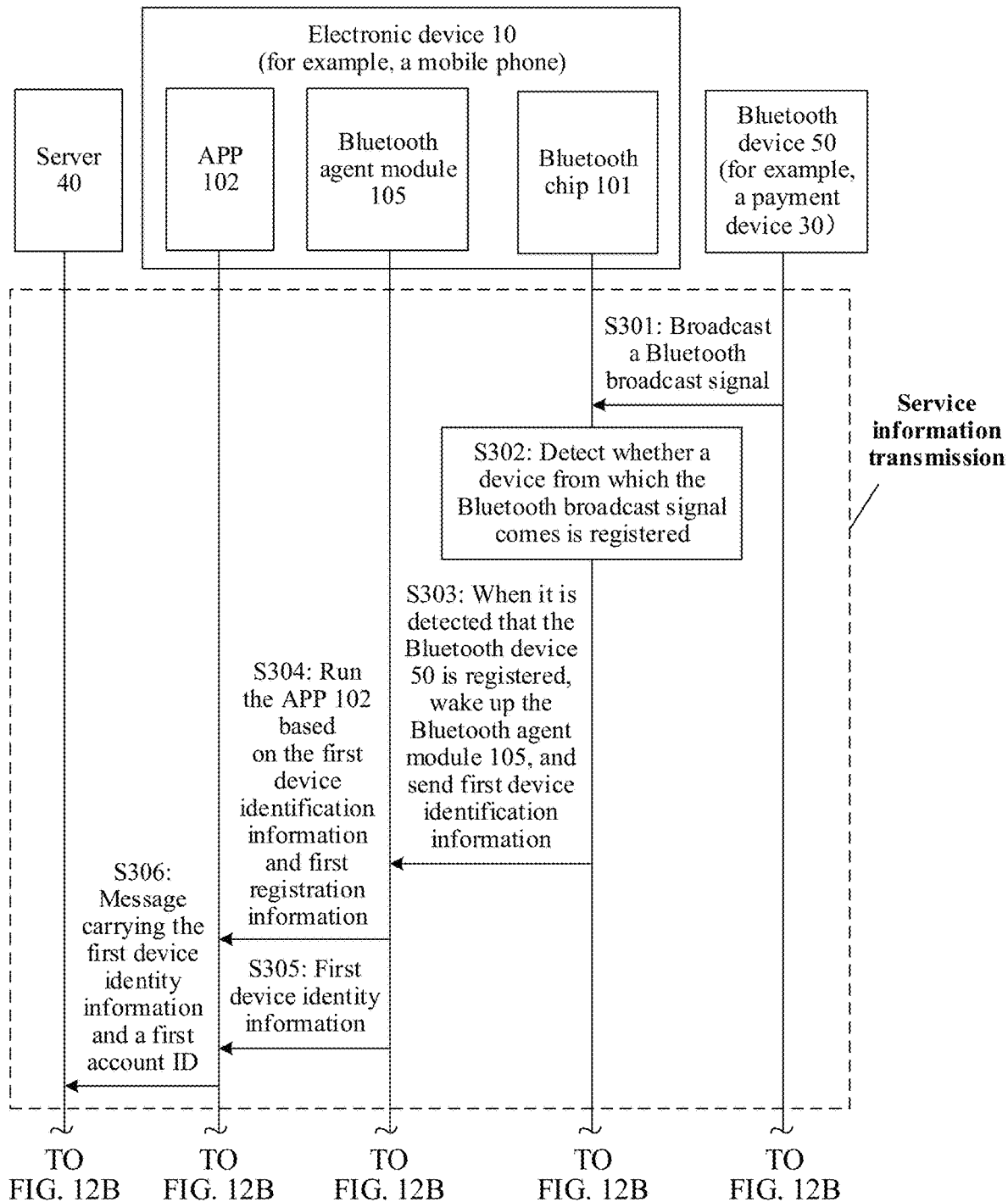
FIG. 12A and FIG. 12B are a schematic flowchart of a service execution method according to an embodiment of this application.
Figure 12B:
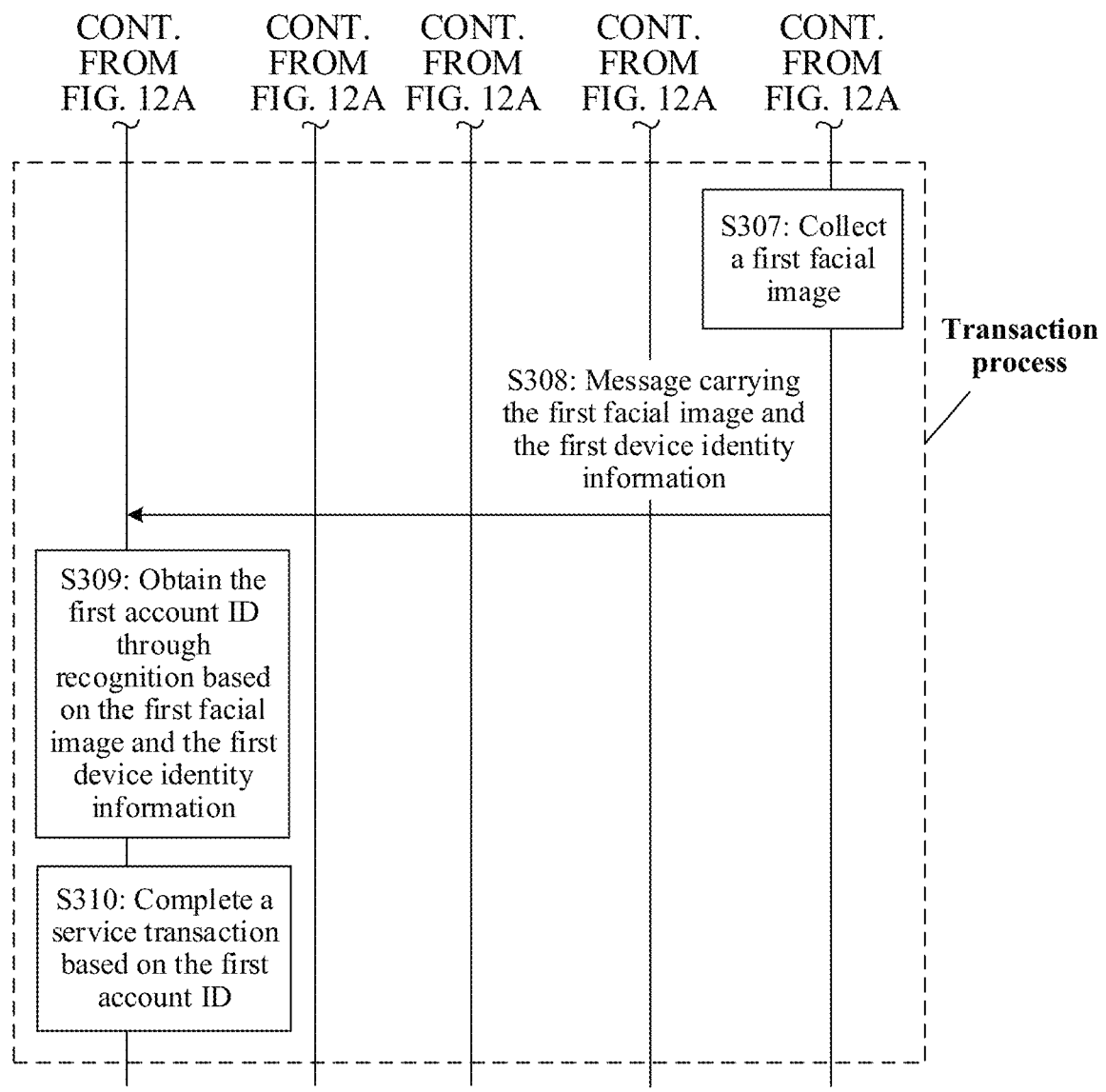

After registration is completed and the account is logged in to, the electronic device 10 may perform the service execution method according to the embodiments of this application. FIG. 12A and FIG. 12B are a schematic flowchart of a service transaction method according to an embodiment of this application. The service transaction method is based on the system architecture shown in FIG. 9, and the service transaction method includes steps S301 to S310.

S301: The Bluetooth device 50 broadcasts a Bluetooth broadcast signal.

The Bluetooth broadcast signal may carry the first device identification information (for example, a first UUID) and first device identity information (for example, a first device ID). The first device identity information is in a one-to-one correspondence with the Bluetooth device 50.

S302: The Bluetooth chip 101 receives the Bluetooth broadcast signal, and detects whether the device (the Bluetooth device 50) from which the received Bluetooth broadcast signal comes is registered with the electronic device 10.

When the electronic device 10 is in a sleep state (for example, the electronic device 10 is in a screen-off sleep state), if the Bluetooth chip 101 detects that the device from which the received Bluetooth broadcast signal comes is not registered with the electronic device 10, the Bluetooth agent module 105 may be in a sleep state.

S303: When the device from which the received Bluetooth broadcast signal comes is registered with the electronic device 10, the Bluetooth chip 101 wakes up the Bluetooth agent module 105, and sends the first device identification information.

If the Bluetooth agent module 105 is already in a started state, the first device identification information can be sent to the Bluetooth agent module 105 without waking up the Bluetooth agent module 105.

S304: The Bluetooth agent module 105 runs the APP 102 based on the first device identification information and the first registration information.

The Bluetooth agent module 105 stores the first registration information in step S203 in the registration process shown in FIG. 9. The Bluetooth agent module 105 finds the first registration information by using the first device identification information, and finds and runs the APP 102 by using the APP_AWAKE_ID in the first registration information.

The ⑤ OPTION in the first registration information may indicate that a data receiving entity is the APP 102, and the Bluetooth chip 101 wakes up the APP 102 after obtaining the first device identification information through scanning. The Bluetooth agent module 105 may further determine, based on the OPTION, that the APP 102 needs to be run. Then, the APP 102 is run by using the APP_AWAKE_ID in the first registration information.

Optionally, if the APP 102 is already in a running state, there is no need to run the APP 102.

S305: The Bluetooth agent module 105 sends the first device identity information to the APP 107.

The first device identity information may be sent by the Bluetooth chip 101 to the Bluetooth agent module 105 together with the first device identification information in step S303.

S306: The APP 102 sends, to the server 40, a message carrying the first device identity information and a first account ID.

Steps S301 to S306 are performed, so that service information (for example, a device ID of the Bluetooth device 50) from the external Bluetooth device 50 may be transmitted to the APP 102, and the APP 102 sends the service information to the server 40 to prepare for a subsequent transaction process. The first account ID is an ID of a login account on the APP 102. For example, the account ID of the Alipay APP may be an Alipay account.

After step S306, the user may execute the transaction process (for example, imperceptible facial payment) in a verification manner, for example, facial verification or fingerprint verification. For details, refer to steps S307 to S310. For steps S307 to S310, refer to descriptions of steps S105 to S108 in the example shown in FIG. 7. Details are not described herein again.

S307: The Bluetooth device 50 collects a first facial image.

S308: The Bluetooth device 50 sends, to the server 40, a message carrying the first facial image and the first device identity information.

S309: The server 40 obtains the first account ID through recognition based on the first facial image and the first device identity information.

S310: The server 40 completes a service transaction based on the first account ID.

In the foregoing service transaction method process, the Bluetooth agent module 105 is started only after the device from which the Bluetooth broadcast signal received by the Bluetooth chip 101 comes is registered with the electronic device 10. The Bluetooth agent module 105 and an application processor in the electronic device 10 do not need to be always in a working state, to reduce power consumption and memory usage of the electronic device 10.

In this embodiment of this application, the Bluetooth agent module 105 may run the APP 102, and the user does not need to manually run the APP 102. In this way, the service transaction execution process is imperceptible to the user, and convenience of the service execution process is improved.

In this embodiment of this application, the Bluetooth agent module 105 may run the APP 102, but the APP 102 does not need to be always run on the electronic device 10, and the APP 102 may be stopped running by the application processor, to further reduce power consumption and memory usage of the electronic device 10.

In this embodiment of this application, the Bluetooth agent module 105 further provides a Bluetooth scanning management platform for a Bluetooth-related service transaction process.

In a possible implementation, the Bluetooth scanning function in step S302 may be implemented by the user manually turning on the Bluetooth scanning switch 1001. Refer to FIG. 11(a), FIG. 11(b1), and FIG. 11(b2). In another possible implementation, the Bluetooth scanning function may alternatively be enabled when the electronic device 10 detects that the Bluetooth scanning function is not enabled. For example, in the example of the registration process described in FIG. 12A and FIG. 12B, the Bluetooth agent module 105 enables the Bluetooth scanning function by performing steps S204 and S205. Alternatively, after registration is completed, the Bluetooth agent module 105 may automatically enable the Bluetooth scanning function in the service transaction process. The Bluetooth agent module 105 may enable the Bluetooth scanning function, so that the user does not need to manually enable the Bluetooth scanning function. In this way, the service transaction execution process is imperceptible to the user, and convenience of the service transaction process is improved.

(c) Deregistration Process

Figure 13:
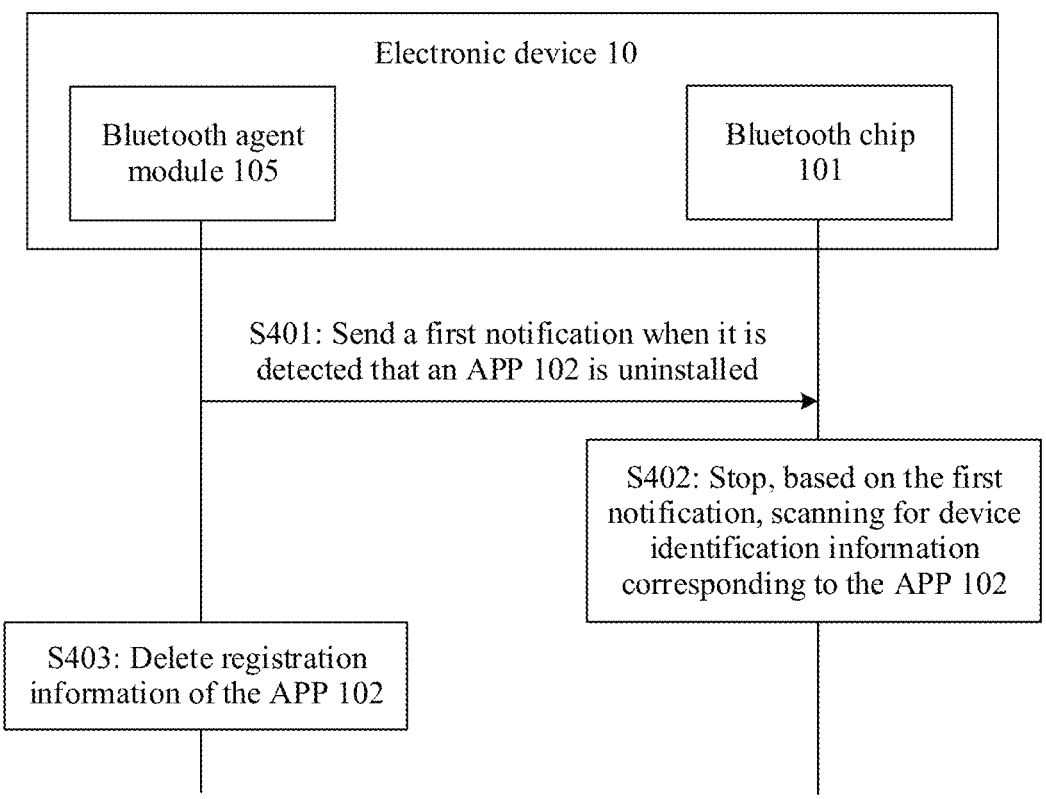
FIG. 13 is a schematic flowchart of deregistration of an APP 102 according to an embodiment of this application.

The registered APP 102 on the electronic device 10 may further be deregistered in response to a user operation. The following specifically describes the deregistration process according to this embodiment of this application. FIG. 13 is a schematic flowchart of deregistration of the APP 102 according to an embodiment of this application. The deregistration process of the APP 102 includes steps S401 to S406.

S401: When detecting that the APP 102 is uninstalled, the Bluetooth agent module 105 sends a first notification to the Bluetooth chip 101. The first notification indicates the Bluetooth chip 101 to stop scanning for the first device identification information.

The first device identification information is first device identification information included in the registration information of the APP 102 during registration. For example, the first device identification information included in the registration information of the APP 102 during registration is the UUID 1, the UUID 2, the UUID 3, and the UUID 4. In this case, the first notification indicates the Bluetooth chip 101 to stop scanning for the UUID 1, the UUID 2, the UUID 3, and the UUID 4. After step S402 is performed, when detecting that the Bluetooth broadcast signal includes the UUID 1, the UUID 2, the UUID 3, and the UUID 4, the Bluetooth chip 101 considers that the device from which the Bluetooth broadcast signal comes is not registered with the electronic device 10, and does not wake up the Bluetooth agent module 105.

In this embodiment of this application, the application processor may detect that the APP 102 is uninstalled, and broadcast a broadcast indicating that the APP 102 is uninstalled. The Bluetooth agent module 105 determines, based on the broadcast indicating that the APP 102 is uninstalled, that the APP 102 is detected to be uninstalled, and performs step S401.

S402: The Bluetooth chip 101 stops, based on the first notification, scanning for the first device identification information.

The Bluetooth chip 101 may delete the stored device identification information corresponding to the APP 102. In the example of step S401, the Bluetooth chip 101 may delete the stored UUID 1, UUID 2, UUID 3, and UUID 4.

S403: The Bluetooth agent module 105 deletes the registration information of the APP 102.

Step S403 may alternatively be performed before step S402.

After the deregistration process of the APP 102 is performed, when detecting that the Bluetooth broadcast signal includes the first device identification information, the Bluetooth chip 101 considers that the device from which the Bluetooth broadcast signal comes is not registered with the electronic device 10. In addition, the Bluetooth agent module 105 is not woken up, and a Bluetooth channel is not established.

(2) Imperceptible Vehicle Lock Unlocking

This service execution method is based on the system architecture described in FIG. 1. For example, the service execution process is to imperceptibly unlock a vehicle lock. A Bluetooth device 60 may be the vehicle 20 shown in FIG. 1. It may be understood that in this embodiment of this application, the scenario of imperceptible vehicle lock unlocking is used as an example for description, and another service scenario may alternatively be used. This is not limited in this embodiment of this application.

Figure 14:
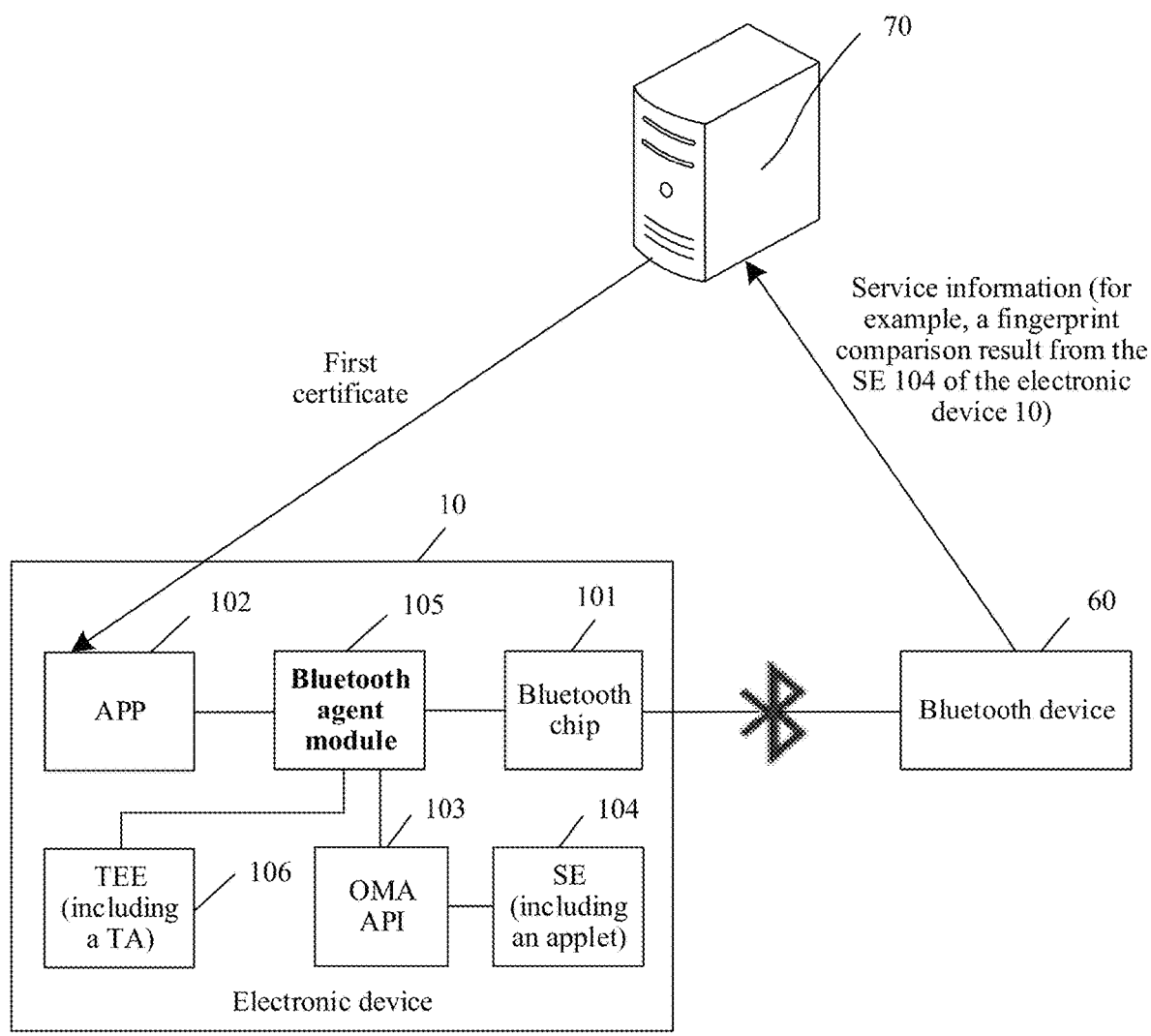
FIG. 14 is a schematic diagram of an architecture of a Bluetooth system according to an embodiment of this application.

FIG. 14 is a schematic diagram of an architecture of a Bluetooth system according to an embodiment of this application. As shown in FIG. 14, the Bluetooth system includes an electronic device 10, the Bluetooth device 60 (for example, the vehicle 20), and a server 70. As shown in FIG. 14, the electronic device 10 includes a Bluetooth chip 101, a Bluetooth agent module 105, an APP 102, an OMA API 103, an SE 104, and a TEE 106. The Bluetooth system may include either the SE 104 that is connected to the OMA API 103 or the TEE 106, or may include both the SE 104 and the TEE 106. The Bluetooth chip 101 establishes a connection to the Bluetooth agent module 105. The Bluetooth agent module 105 is connected to the TEE 106, and the Bluetooth agent module 105 is connected to the SE 104 through the OMA API 103.

Before the system architecture is used for imperceptible vehicle lock unlocking, a user needs to install the APP 102 on the electronic device 10, and the electronic device 10 completes a registration process. The following processes are separately described: (d) the registration process and (e) a service execution process. In this embodiment of this application, for a deregistration process of the APP 102, refer to specific descriptions in the example shown in FIG. 13. Details are not described herein again.

(d) Registration Process

Figure 15:
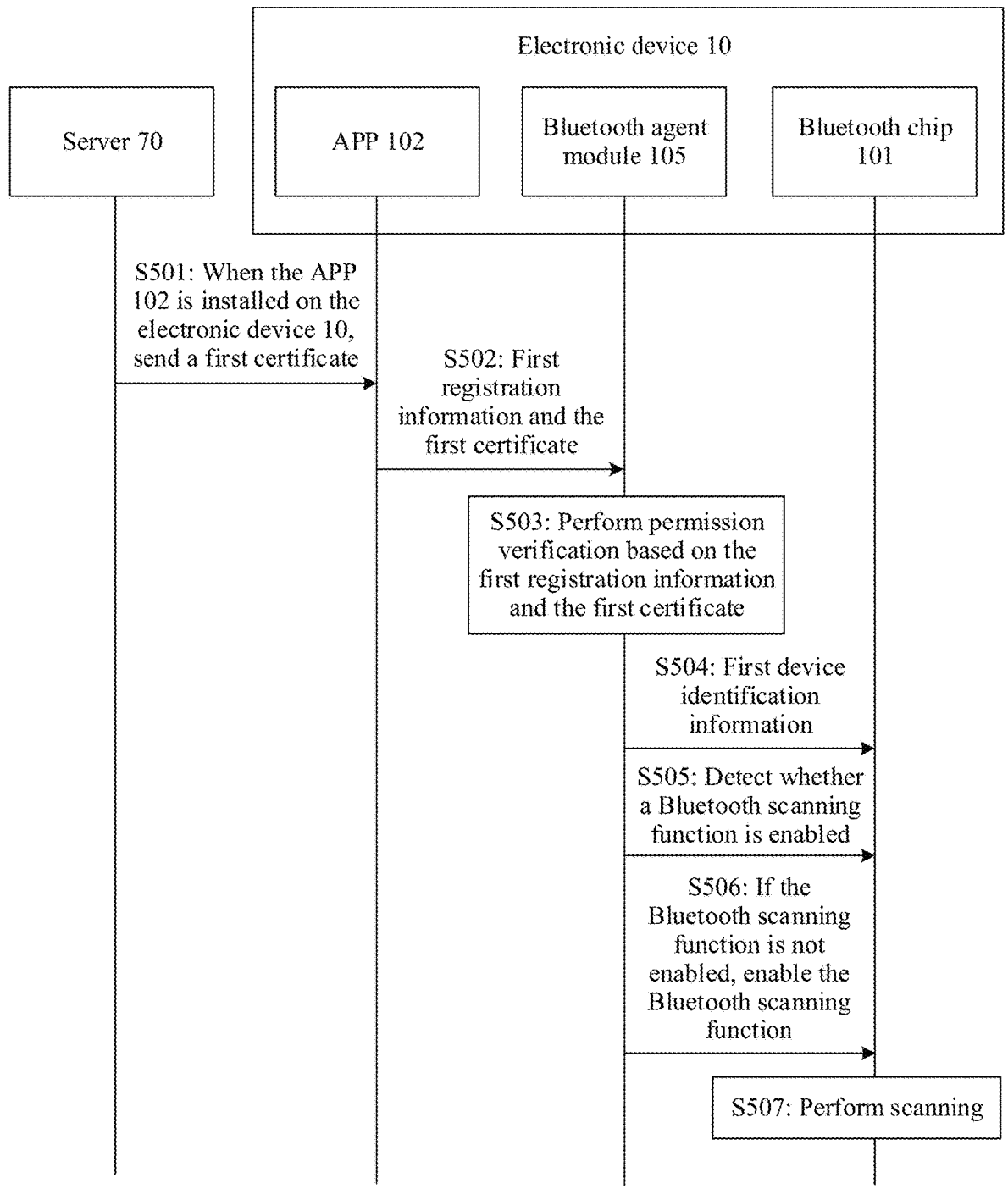
FIG. 15 is a schematic flowchart of a registration process of an APP 102 according to an embodiment of this application.

The following describes the registration process with reference to the system architecture shown in FIG. 14 and a process shown in FIG. 15. FIG. 15 is a schematic flowchart of the registration process of the APP 102 according to an embodiment of this application. The registration process of the APP 102 includes steps S501 to S506.

S501: When the APP 102 is installed on the electronic device 10, the APP 102 obtains a first certificate from the server 70.

In this embodiment of this application, if an APP ID of the APP 102 is not stored in the Bluetooth agent module 105, the APP 102 may obtain the first certificate from the server 70. The first certificate may be used to prove permission of the APP 102 to the Bluetooth agent module 105.

In a possible implementation, when the APP 102 is installed on the electronic device 10, the APP 102 may send, to the server 70, a message used to request to deliver the first certificate. Then, the server 70 sends the first certificate to the APP 102. In another possible implementation, when the APP 102 is installed on the electronic device 10, the server 70 delivers the first certificate to the APP 102.

S502: The APP 102 sends first registration information and the first certificate to the Bluetooth agent module 105.

Optionally, the APP 102 may further send the first certificate to the Bluetooth agent module 105. The first certificate may prove the permission of the APP 102 to the Bluetooth agent module 105, so that permission verification performed on the APP 102 in step S503 succeeds.

S503: The Bluetooth agent module 105 performs permission verification on the APP 102 based on the first registration information and the first certificate.

S504: When the permission verification succeeds, the Bluetooth agent module 105 sends first device identification information to the Bluetooth chip 101.

S505: The Bluetooth agent module 105 detects whether a Bluetooth scanning function of the Bluetooth chip 101 is enabled.

S506: When detecting that the Bluetooth scanning function of the Bluetooth chip 101 is not enabled, the Bluetooth agent module 105 enables the Bluetooth scanning function.

S507: The Bluetooth chip 101 performs scanning.

The following describes the first certificate in step S502 and the permission verification process in step S503.

The first certificate is a digital certificate digitally signed by a certificate authority (certificate authority, CA). The certificate authority is approved by the Bluetooth agent module 105. The first certificate may include a public key of the server 70, a name of the server 70, and a digital signature of the certificate authority. When the Bluetooth agent module 105 performs identity authentication by using the first certificate, the first certificate may randomly generate an identity code. Each digital certificate can generate a corresponding identity code, but an identity code generated each time is different.

The first certificate is electronic data, including identity information of the server 70, that is reviewed and issued by an authentication center. Therefore, the first certificate may prove, to the Bluetooth agent module 105 by using the digital signature of the certificate authority, that the server 70 is authenticated by the certificate authority.

The Bluetooth agent module 105 stores a public key of the certificate authority, and performs verification on the digital signature of the certificate authority in the first certificate by using the public key of the certificate authority. When the verification succeeds, the permission verification succeeds. Then, steps S504 to S507 are performed.

For steps S504 to S507, refer to descriptions of steps S203 to S206 in the example shown in FIG. 10. Details are not described herein again.

(e) Service Execution Process

Figure 16:
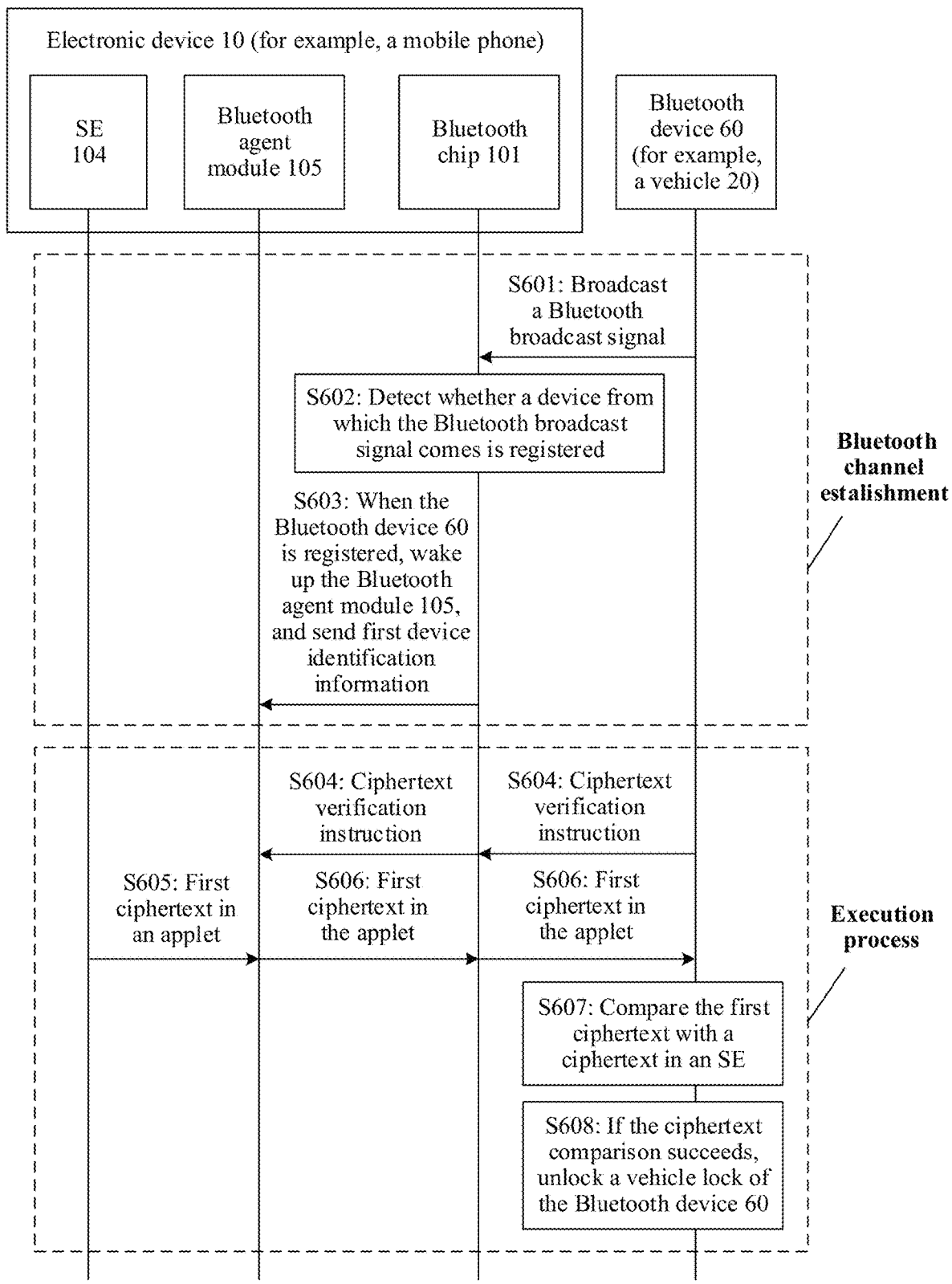
FIG. 16 is a schematic flowchart of a service execution method according to an embodiment of this application.

After registration is completed and an account is logged in to, the electronic device 10 may perform the service execution method according to the embodiments of this application. FIG. 16 is a schematic flowchart of a service execution method according to an embodiment of this application. In the service execution method, an example in which a Bluetooth channel is established between the external Bluetooth device 60 and the SE 104 is used. Establishment of a Bluetooth channel between the external Bluetooth device 60 and the TEE 106 is similar. The service execution method is based on the system architecture shown in FIG. 14, and the service execution method includes steps S601 to S608.

S601: The Bluetooth device 60 broadcasts a Bluetooth broadcast signal.

The Bluetooth broadcast signal may carry the first device identification information (for example, a first UUID) and first device identity information (for example, a first device ID). The first device identity information is in a one-to-one correspondence with the Bluetooth device 50.

S602: The Bluetooth chip 101 receives the Bluetooth broadcast signal from the Bluetooth device 60, and detects whether the device from which the received Bluetooth broadcast signal comes is registered with the electronic device 10.

When the electronic device 10 is in a sleep state (for example, the electronic device 10 is in a screen-off sleep state), if the Bluetooth chip 101 detects that the device (the Bluetooth device 50) from which the Bluetooth broadcast signal comes is not registered with the electronic device 10, the Bluetooth agent module 105 may be in a sleep state.

S603: When detecting that the device from which the Bluetooth broadcast signal comes is registered with the electronic device 10, the Bluetooth chip 101 wakes up the Bluetooth agent module 105, and sends the first device identification information.

The Bluetooth agent module 105 stores the first registration information in step S203 in the registration process shown in FIG. 10. The Bluetooth agent module 105 finds the first registration information by using the first device identification information. A ⑤ OPTION in the first registration information may indicate that a data receiving entity is the TEE 106, and the Bluetooth chip 101 does not wake up the APP 102 after obtaining the first device identification information through scanning. When detecting that the device from which the Bluetooth broadcast signal comes is registered with the electronic device 10, the Bluetooth agent module 105 may establish a channel to the Bluetooth device 60. In this case, the channel between the Bluetooth agent module 105 and the external Bluetooth device is established by using steps S601 to S603, and the Bluetooth agent module 105 may obtain service information of the TEE 106 and transmit the service information to the external Bluetooth device.

After step S603, the user may execute a transaction process (for example, imperceptibly unlock the vehicle lock) when the user carries the electronic device 10 and moves close to the Bluetooth device 60. Refer to steps S604 to S608. For steps S307 to S310, refer to descriptions of steps S105 to S108 in the example shown in FIG. 7. Details are not described herein again.

For example, in a scenario in which the Bluetooth device 60 unlocks the vehicle lock of the vehicle 20, when detecting that a distance between the vehicle 20 and the electronic device 10 is less than or equal to a specific distance (for example, 30 meters), the vehicle 20 may perform steps S601 to S603 to establish the Bluetooth channel to the Bluetooth agent module 105. After the channel between the Bluetooth agent module 105 and the vehicle 20 is established by using steps S601 to S603, the vehicle 20 may detect the distance between the electronic device 10 and the vehicle 20 in real time. When the vehicle 20 detects that the distance between the vehicle 20 and the electronic device 10 is less than or equal to a specific distance (for example, 10 meters), the vehicle 20 may perform steps S604 to S607 to complete a verification process. When the vehicle 20 detects that the distance between the vehicle 20 and the electronic device 10 is less than or equal to a specific distance (for example, 3 meters), step S608 is performed to unlock the vehicle lock.

> S604: The Bluetooth device 60 sends a ciphertext verification instruction to the Bluetooth agent module 105 through the channel.

The ciphertext verification instruction may be transmitted after being encrypted by using a digital signature. The ciphertext verification instruction may include a digital signature of the Bluetooth device 60, for example, a digital signature including a private key of the Bluetooth device 60. The Bluetooth agent module 105 may store a public key corresponding to the private key of the Bluetooth device 60. After receiving the ciphertext verification instruction, the Bluetooth agent module 105 first uses the public key to verify the digital signature of the Bluetooth device 60. If the verification succeeds, step S605 is performed.

> S605: The Bluetooth agent module 105 obtains a first ciphertext from an applet of the SE 104.
> S606: The Bluetooth agent module 105 sends the first ciphertext to the Bluetooth device 60 through the Bluetooth chip 101.

In a transmission process in step S606, the first ciphertext may be encrypted for transmission. An encryption method is not limited in this embodiment of this application.

> S607: The Bluetooth device 60 compares the first ciphertext with a ciphertext in an SE.
> S608: If the ciphertext comparison succeeds, the Bluetooth device 60 unlocks the vehicle lock of the Bluetooth device 60.

For example, if the first ciphertext is the same as a ciphertext in an applet of the SE of the Bluetooth device 60, comparison succeeds.

In the foregoing service execution method process, the Bluetooth agent module 105 is started only after the Bluetooth chip 101 detects that the device (the Bluetooth device 60) from which the Bluetooth broadcast signal comes is registered with the electronic device 10. The Bluetooth agent module 105 and an application processor in the electronic device 10 do not need to be always in a working state, to reduce power consumption and memory usage of the electronic device 10.

In the foregoing service execution method process, the Bluetooth channel is directly established between the SE 104 and the Bluetooth device 60 without running the APP 102, to reduce power consumption and memory usage of the electronic device 10.

In the foregoing service execution method process, the user does not need to manually run the APP 102. In this way, the service execution process is imperceptible to the user, and convenience of the service execution process is improved.

In the foregoing service execution method process, the APP 102 does not need to be kept in a running state, to further reduce power consumption and memory usage of the electronic device 10. In this embodiment of this application, the Bluetooth agent module 105 further provides a management platform for establishing a Bluetooth channel for a Bluetooth-related service execution process.

In a possible implementation, the Bluetooth scanning function in step S602 may be implemented by the user manually turning on the Bluetooth scanning switch 1001. Refer to FIG. 11(*a*), FIG. 11(*b*1), and FIG. 11(*b*2). In another possible implementation, the Bluetooth scanning function may alternatively be enabled when the electronic device 10 detects that the Bluetooth scanning function is not enabled. For example, in the example of the registration process described in FIG. 15, the Bluetooth agent module 105 enables the Bluetooth scanning function by performing steps S505 and S506. Alternatively, after registration is completed, the Bluetooth agent module 105 may automatically enable the Bluetooth scanning function in the service process. The Bluetooth agent module 105 may enable the Bluetooth scanning function, so that the user does not need to manually enable the Bluetooth scanning function. In this way, the service execution process is imperceptible to the user, and convenience of the service execution process is improved.

In some other embodiments of this application, the APP 102 may further establish a connection to the SE 104 through the OMA API 103. The ⑤ OPTION in the first registration information may indicate that a data receiving entity is the SE 104, and the Bluetooth chip 101 wakes up the APP 102 after obtaining the first device identification information through scanning. After step S603, the Bluetooth agent module 105 wakes up the APP 102. The Bluetooth agent module 105 may establish the channel to the external Bluetooth device 60, and the Bluetooth agent module 105 is connected to the SE 104, so that service information (for example, a ciphertext) in the SE 104 may be transmitted to the Bluetooth device 60 (for example, the vehicle).

In this embodiment of this application, the Bluetooth device 60 may further establish a communication connection to the server 70, as shown in FIG. 14. The Bluetooth device 60 may exchange service information with the server 70 through the communication connection. For example, the service information is a fingerprint comparison result from the SE 104 in the electronic device 10.

Specifically, after the channel is established between the Bluetooth agent module 105 and the external Bluetooth device, if the server 70 needs to verify a user identity on the electronic device 10 in the transaction process, for example, verify a fingerprint or a facial image of the user, after the verification is completed, the electronic device 10 may send a comparison result to the server 70 through the Bluetooth device 60. Fingerprint verification is used as an example. First, the electronic device 10 compares a detected fingerprint with a pre-stored fingerprint, and stores a comparison result in the SE 104 of the electronic device 10. The Bluetooth agent module 105 obtains the comparison result from the SE 104. The Bluetooth agent module 105 sends the comparison result to the Bluetooth device 60 through the Bluetooth connection. The Bluetooth device 60 sends the comparison result to the server 70 through the communication connection between the Bluetooth device 60 and the server 70, to complete the transaction process.

It may be understood that the communication connection between the Bluetooth device 60 and the server 70 is not limited to the foregoing function example, and may further be used to transmit other service information in the service execution process. This is not limited in this embodiment of this application.

Figure 17:
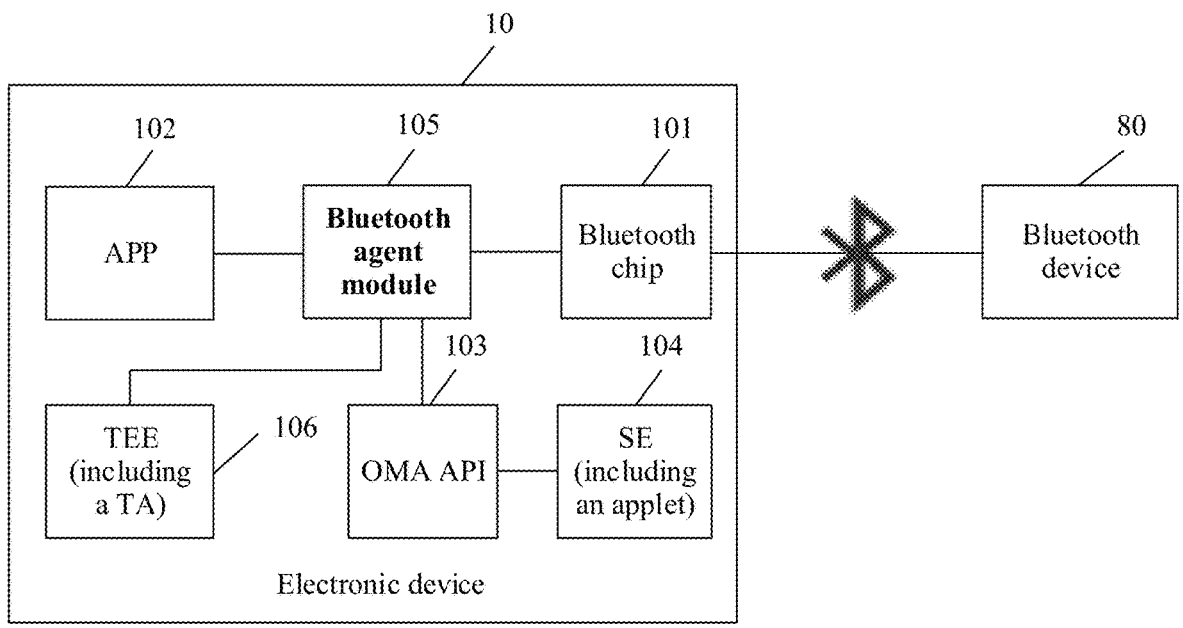
FIG. 17 is a schematic diagram of an architecture of a Bluetooth system according to an embodiment of this application.

For the service execution process of imperceptible vehicle lock unlocking, the server 70 may alternatively not be required in the registration process of the APP 102. The Bluetooth agent module 105 stores the APP_ID of the APP 102, and the Bluetooth agent module 105 may perform permission verification on the APP by using the APP_ID of the APP 102. Specifically, FIG. 17 is a schematic diagram of an architecture of a Bluetooth system according to an embodiment of this application. As shown in FIG. 17, the Bluetooth system includes the electronic device 10 and a Bluetooth device 80 (for example, the vehicle 20). As shown in FIG. 17, the electronic device 10 includes the Bluetooth chip 101, the Bluetooth agent module 105, the APP 102, the OMA API 103, the SE 104, and the TEE 106. The Bluetooth system may include either the SE 104 that is connected to the OMA API 103 or the TEE 106, or may include both the SE 104 and the TEE 106. The Bluetooth chip 101 establishes a connection to the Bluetooth agent module 105. The Bluetooth agent module 105 is connected to the TEE 106, and the Bluetooth agent module 105 is connected to the SE 104 through the OMA API 103.

After the APP 102 is installed on the electronic device 10, a registration process needs to be completed for the APP. For the registration process, refer to the embodiment described in FIG. 10. The registration process is completed only on the electronic device 10. For a service execution process, refer to the embodiment described in FIG. 16. Neither the registration process nor the service execution process requires interaction with a server. For a service deregistration process, refer to specific descriptions in the example shown in FIG. 13. Details are not described herein again.

(3) Automatically Uploading the Data of the Weight Scale

In this service execution method, an example in which service information (for example, weight information) is imperceptibly uploaded to an electronic device is used for description. A Bluetooth device 50 may be a weight scale 90. It may be understood that in this embodiment of this application, a scenario of automatically uploading data of the weight scale 90 is used as an example for description, and another service scenario may alternatively be used. This is not limited in this embodiment of this application. An electronic device 10 may receive a Bluetooth broadcast signal. An APP 102 corresponding to the weight scale 90 may be installed on the electronic device 10. The APP 102 on the electronic device 10 may establish a channel to the weight scale 90 by using a Bluetooth broadcast signal, and the weight scale 90 may upload weight data detected in real time to the APP 102. In the foregoing process of uploading the data of the weight scale 90, the data of the weight scale 90 can be imperceptibly uploaded without the user manually operating the APP 102 on the electronic device 10.

Figure 18:
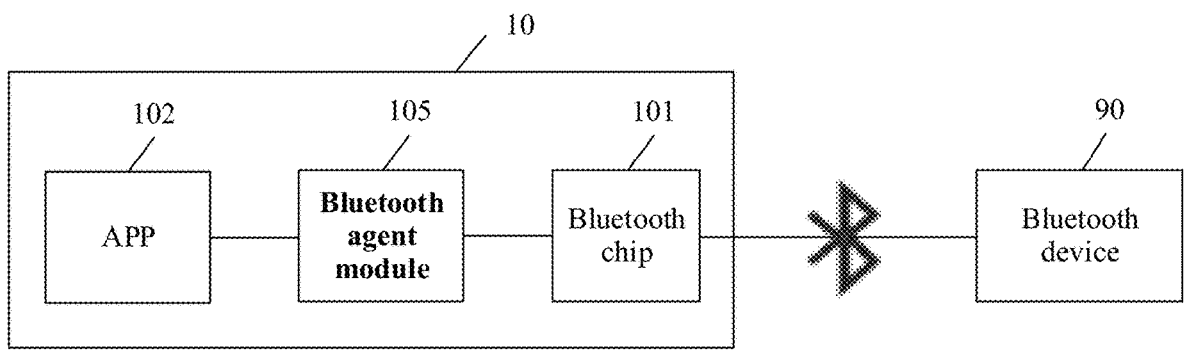
FIG. 18 is a schematic diagram of an architecture of a Bluetooth system according to an embodiment of this application.

FIG. 18 is a schematic diagram of an architecture of a Bluetooth system according to an embodiment of this application. As shown in FIG. 18, the Bluetooth system includes the Bluetooth device (for example, the weight scale 90) and the electronic device 10.

As shown in FIG. 18, the electronic device 10 includes a Bluetooth chip 101, a Bluetooth agent module 105, and the APP 102. The Bluetooth chip 101 establishes a connection to the Bluetooth agent module 105, and the Bluetooth agent module 105 establishes a connection to the APP 102.

After the APP 102 is installed on the electronic device 10, a registration process needs to be completed for the APP. For the registration process, refer to the embodiment described in FIG. 10. The registration process is completed only on the electronic device 10.

Figure 19:
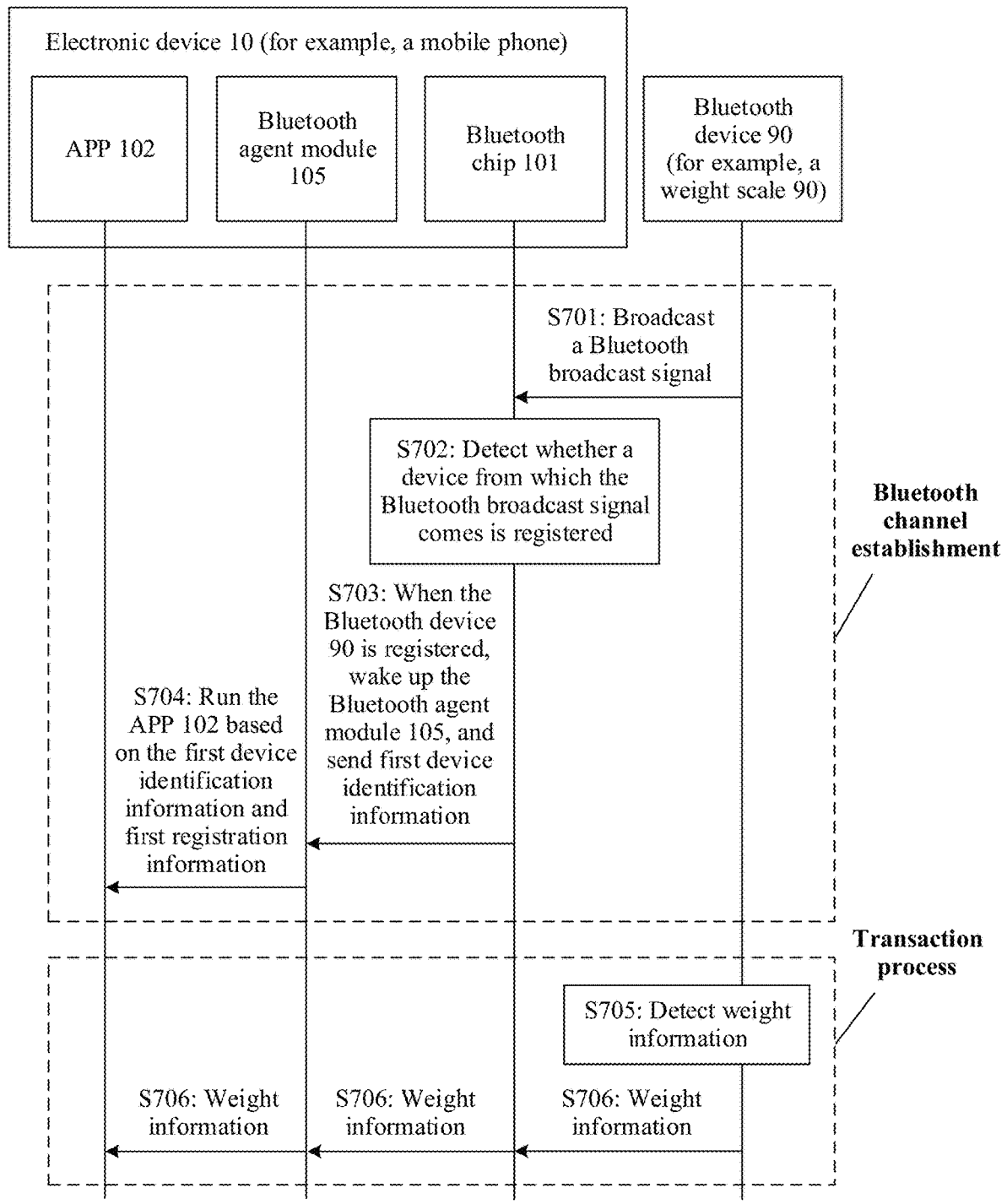
FIG. 19 is a schematic flowchart of a service execution method according to an embodiment of this application.

After registration is completed and an account is logged in to, the electronic device 10 may perform the service execution method according to the embodiments of this application. FIG. 19 is a schematic flowchart of a service execution method according to an embodiment of this application. As shown in FIG. 19, the service execution method includes steps S701 to S706.

S701: The Bluetooth device 90 broadcasts a Bluetooth broadcast signal.

The Bluetooth broadcast signal may carry first device identification information (for example, a first UUID) and first device identity information (for example, a first device ID). The first device identity information is in a one-to-one correspondence with the Bluetooth device 50.

S702: The Bluetooth chip 101 receives the Bluetooth broadcast signal, and detects whether the device (the Bluetooth device 90) from which the Bluetooth broadcast signal comes is registered with the electronic device 10.

When the electronic device 10 is in a sleep state (for example, the electronic device 10 is in a screen-off sleep state), if the Bluetooth chip 101 detects that the device (the Bluetooth device 90) from which the Bluetooth broadcast signal comes is not registered with the electronic device 10, the Bluetooth agent module 105 may be in a sleep state.

S703: When detecting that the device from which the Bluetooth broadcast signal comes is registered with the electronic device 10, the Bluetooth chip 101 wakes up the Bluetooth agent module 105, and sends the first device identification information.

S704: The Bluetooth agent module 105 runs the APP 102 based on the first device identification information and first registration information.

For descriptions of steps S701 to S704, refer to specific descriptions of steps S301 to S304 in the service execution method described in FIG. 12A and FIG. 12B.

When detecting that the device from which the Bluetooth broadcast signal comes is registered with the electronic device 10, the Bluetooth agent module 105 may establish a channel to the Bluetooth device 90 by using steps S701 to S704. Service information (for example, weight information) from the Bluetooth device 90 may be transmitted to the Bluetooth agent module 105. The Bluetooth agent module 105 may wake up the APP, and transmit the service information (for example, the weight information) to the APP 102.

Optionally, the service information (for example, the weight information) from the external Bluetooth device 90 may alternatively be received by the Bluetooth chip 101 in a form of a broadcast signal, and transmitted to the Bluetooth agent module 105. Then, the service information is transmitted by the Bluetooth agent module 105 to the APP 102.

S705: The Bluetooth device 90 detects weight information.

The weight information may include data such as a weight value, a body fat value, and a health index. For example, the weight information may be sent to the APP 102 through a Bluetooth connection.

S706: The Bluetooth device 90 sends the weight information to the APP 102 through a channel between the Bluetooth device 90 and the APP 102.

The APP 102 may store the weight information, and the APP 102 may further display the weight information.

In the foregoing method process, in a process of establishing a Bluetooth connection between the Bluetooth device 90 and the Bluetooth chip 101, the Bluetooth agent module 105 is started only after the Bluetooth chip 101 detects that the device (the Bluetooth device 90) from which the Bluetooth broadcast signal comes is registered with the electronic device 10. The Bluetooth agent module 105 and an application processor in the electronic device 10 do not need to be always in a working state, to reduce power consumption and memory usage of the electronic device 10.

In the foregoing process in which the weight scale uploads the weight information to the application, the user does not need to manually run the APP 102. In this way, the execution process is imperceptible to the user, and convenience of the service execution process is improved.

In the foregoing process in which the weight scale uploads the weight information to the application, the APP 102 does not need to be kept in a running state, to further reduce power consumption and memory usage of the electronic device 10. In this embodiment of this application, the Bluetooth agent module 105 further provides a management platform for a Bluetooth-related service execution process.

In another possible implementation, a Bluetooth scanning function may alternatively be enabled when the electronic device 10 detects that the Bluetooth scanning function is not enabled. For example, in the example of the registration process, the Bluetooth agent module 105 enables the Bluetooth scanning function. Alternatively, after registration is completed, the Bluetooth agent module 105 may automatically enable the Bluetooth scanning function in the service execution process. The Bluetooth agent module 105 may enable the Bluetooth scanning function, so that the user does not need to manually enable the Bluetooth scanning function. In this way, the service execution process is imperceptible to the user, and convenience of the service execution process is improved.

Figure 20:
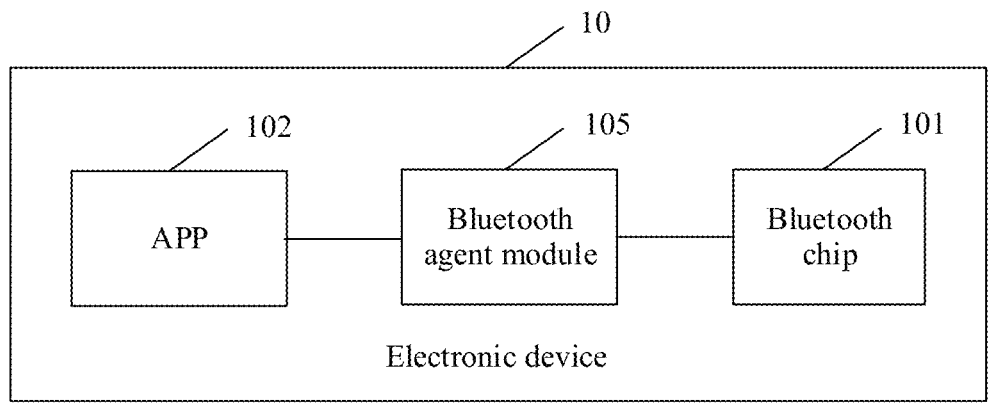
FIG. 20 is a schematic diagram of a structure of an electronic device 10 according to an embodiment of this application.

FIG. 20 is a schematic diagram of a structure of an electronic device 10 according to an embodiment of this application. The method is performed on the electronic device 10. The electronic device 10 may be the electronic device 10 in any system architecture in FIG. 8, FIG. 9, FIG. 14, FIG. 17, or FIG. 18. As shown in FIG. 20, the electronic device 10 includes a Bluetooth chip 101 and a Bluetooth agent module 105. The Bluetooth chip 101 is connected to the Bluetooth agent module 105.

Figure 21:
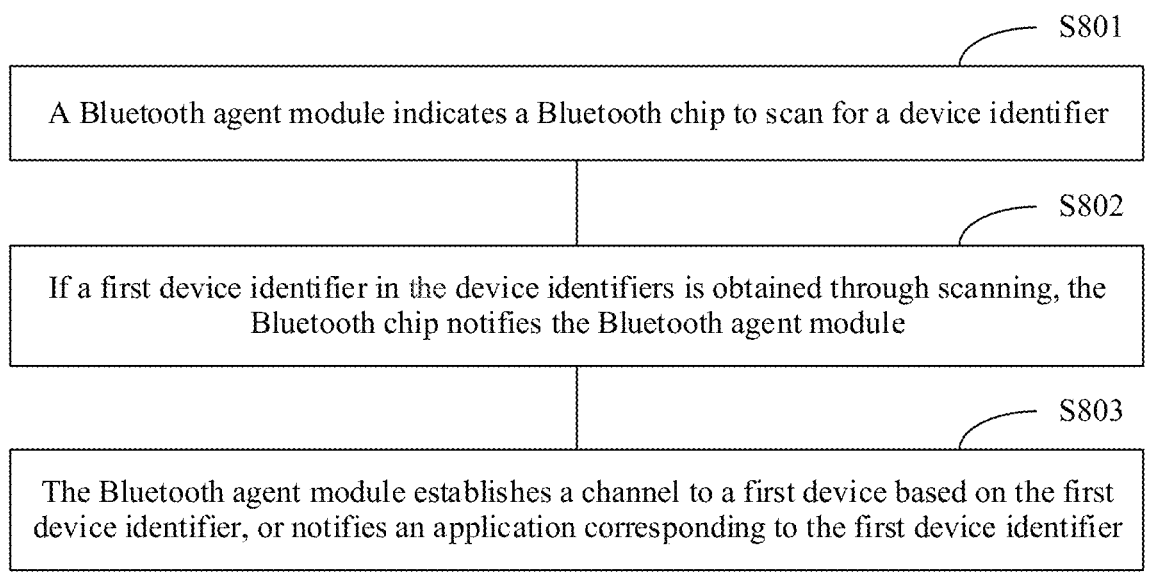
FIG. 21 is a schematic flowchart of a Bluetooth scanning method according to an embodiment of this application.

FIG. 21 is a schematic flowchart of a Bluetooth scanning method according to an embodiment of this application. As shown in FIG. 21, based on the electronic device 10 described in FIG. 20 and any system architecture in FIG. 8, FIG. 9, FIG. 14, FIG. 17, or FIG. 18, the Bluetooth scanning method includes steps S801 to S803.

S801: The Bluetooth agent module indicates the Bluetooth chip to scan for a device identifier.

In this embodiment of this application, in a phase of registering an application with the electronic device, the Bluetooth agent module indicates a device identifier that needs to be scanned by the Bluetooth chip. For the registration phase of the application, refer to the examples described in FIG. 10 and FIG. 15. Details are not described herein again.

The device identifier is a UUID of an external Bluetooth device.

S802: If a first device identifier in the device identifiers is obtained through scanning, the Bluetooth chip notifies the Bluetooth agent module.

That the first device identifier is obtained through scanning may mean that in a registration process of an application corresponding to the first device identifier, the first device identifier is stored in the Bluetooth chip, and the Bluetooth chip detects that the first device identifier is stored in the Bluetooth chip. In other words, a first device from which the Bluetooth broadcast signal comes is registered with the electronic device 10. In this embodiment of this application, the first device may be an external Bluetooth device, for example, a payment device or a vehicle.

S803: The Bluetooth agent module establishes a channel to the first device based on the first device identifier, or notifies the application corresponding to the first device identifier.

When the electronic device 10 is in a sleep state (for example, the electronic device 10 is in a screen-off sleep state), if the Bluetooth chip 101 detects that a received device identifier is not included in a device identifier list pre-stored in the Bluetooth chip 101, the Bluetooth agent module 105 may be in a sleep state. If the Bluetooth chip 101 detects that the received first device identifier is included in the device identifier list pre-stored in the Bluetooth chip 101, the Bluetooth chip 101 wakes up the Bluetooth agent module 105, and sends the first device identifier to the Bluetooth agent module 105. In the foregoing Bluetooth scanning method, the Bluetooth agent module 105 is started only when the Bluetooth chip 101 obtains the first device identifier in the device identifiers through scanning. In the electronic device 10, the Bluetooth agent module 105 and an application processor do not need to be always in a working state, to reduce power consumption and memory usage of the electronic device 10.

In the foregoing Bluetooth scanning method, the Bluetooth agent module 105 may run an APP 102, and a user does not need to manually run the APP 102. In this way, an execution process is imperceptible to the user, and convenience of the service execution process is improved. The Bluetooth agent module 105 may run the APP 102, but the APP 102 does not need to be always run on the electronic device 10, and the APP 102 may be stopped running by the application processor, to further reduce power consumption and memory usage of the electronic device 10.

In the foregoing Bluetooth scanning method, the Bluetooth agent module 105 may be connected to an SE, and directly establishes a Bluetooth channel between the Bluetooth chip 101 and a Bluetooth device without running the APP 102, to further reduce power consumption and memory usage of the electronic device 10. The Bluetooth agent module 105 further provides a Bluetooth scanning management platform for a Bluetooth-related service execution process.

The Bluetooth agent module 105 may be connected to the SE, and directly establishes a Bluetooth channel between the Bluetooth chip 101 and a Bluetooth device 60 without running the APP 102, to further reduce power consumption and memory usage of the electronic device 10.

In a possible implementation, after the Bluetooth agent module establishes the channel to the first device based on the first device identifier, the method further includes: The Bluetooth agent module obtains service information corresponding to the first device identifier, and sends the service information to the first device through the channel.

The Bluetooth agent module 105 may establish the channel to the external Bluetooth device (the first device), and the Bluetooth agent module 105 is connected to the SE (or a TEE), so that service information (for example, a ciphertext) in the SE (TEE) may be transmitted to the external Bluetooth device (for example, a vehicle).

For example, the service information is verification information, the verification information is used by the first device to perform verification based on locally stored information and the verification information, and a corresponding service is executed if the verification succeeds. For example, the service information is the ciphertext in the example shown in FIG. 16.

In a possible implementation, the service information is verification result information, and the verification result information is sent to a server, so that the server executes a corresponding service based on the verification result information.

For example, the verification result information is a fingerprint comparison result or a facial comparison result on the electronic device. A payment process or a vehicle lock unlocking process is executed only when the comparison result indicates that comparison succeeds.

In a possible implementation, the service information is information related to verification of an electronic vehicle key, and executing the corresponding service refers to unlocking a corresponding vehicle lock.

For a service execution process of vehicle lock unlocking, refer to the example shown in FIG. 16. Details are not described herein again.

In a possible implementation, after the Bluetooth agent module establishes the channel to the first device based on the first device identifier, the method further includes: The Bluetooth agent module notifies the application corresponding to the first device identifier. The application obtains the service information corresponding to the first device identifier. The application sends the service information corresponding to the first device identifier to the Bluetooth agent module. The Bluetooth agent module sends the service information corresponding to the first device identifier to the first device through the channel.

For example, the service information is verification information, the verification information is used by the first device to perform verification based on locally stored information and the verification information, and a corresponding service is executed if the verification succeeds. For example, the service information is the ciphertext in the example shown in FIG. 16.

In a possible implementation, after the Bluetooth agent module notifies, based on the first device identifier, the application corresponding to the first device identifier, the method further includes: The Bluetooth agent module sends the service information from the first device to the application, so that the application displays the service information to the user.

For example, the first device may alternatively be a weight scale, and the service information may be weight information. For a service execution process of weight information transmission, refer to the example described in FIG. 19. Details are not described herein again.

In the foregoing service execution method process, in a process of establishing a Bluetooth connection between the Bluetooth device and the Bluetooth chip, the Bluetooth agent module is started only after the Bluetooth chip detects that the device (the Bluetooth device) from which the Bluetooth broadcast signal comes is registered with the electronic device. The Bluetooth agent module and the application processor in the electronic device do not need to be always in the working state, to reduce power consumption and memory usage of the electronic device.

In this embodiment of this application, the user does not need to manually run the APP. In this way, the service transaction execution process is imperceptible to the user, and convenience of the service execution process is improved.

In this embodiment of this application, the APP does not need to be kept in a running state, to further reduce power consumption and memory usage of the electronic device. In this embodiment of this application, the Bluetooth agent module further provides a management platform for a Bluetooth-related service transaction process.

In a possible implementation, that the Bluetooth agent module notifies, based on the first device identifier, the application corresponding to the first device identifier includes: The Bluetooth agent module runs, based on the first device identifier, the application corresponding to the first device identifier, and sends the first device identifier to the application. After the Bluetooth agent module notifies, based on the first device identifier, the application corresponding to the first device identifier, the method further includes: The application obtains the service information from the first device, and sends the service information and user account information to a server, so that the server performs verification based on the service information and the user account information that are sent by the application and user information obtained by the first device, and executes a service transaction if the verification succeeds.

The user information is a facial image, and executing the service transaction refers to executing a payment transaction by using the user account information as a transaction account. For a service transaction process of imperceptible payment, refer to the example described in FIG. 12A and FIG. 12B. Details are not described herein again.

In a possible implementation, before the Bluetooth agent module indicates the Bluetooth chip to scan for the device identifier, the method further includes: When detecting that a Bluetooth scanning function is disabled, the Bluetooth agent module enables the Bluetooth scanning function.

For example, in an example of a registration process, the Bluetooth agent module enables the Bluetooth scanning function. Alternatively, after registration is completed, the Bluetooth agent module may automatically enable the Bluetooth scanning function in a service transaction process. The Bluetooth agent module may enable the Bluetooth scanning function, so that the user does not need to manually enable the Bluetooth scanning function. In this way, the service transaction execution process is imperceptible to the user, and convenience of the service transaction process is improved.

In a possible implementation, the Bluetooth agent module is an application/interface at an application framework layer.

In a possible implementation, before the Bluetooth agent module indicates the Bluetooth chip to scan for the device identifier, the method further includes: The Bluetooth agent module performs permission verification on the application. When the permission verification succeeds, the Bluetooth agent module sends the first device identifier to the Bluetooth chip, so that the Bluetooth chip notifies the Bluetooth agent module when obtaining the first device identifier through scanning.

For description of permission verification in the registration process, refer to step S202 in the example described in FIG. 10. Details are not described herein again.

In a possible implementation, that the Bluetooth agent module performs permission verification on the application includes: The Bluetooth agent module detects whether the first device identifier is included in a locally stored legal device identifier list. When the first device identifier is included in the legal device identifier list, the permission verification succeeds.

For a locally executed permission verification process, refer to step S202 in the example described in FIG. 10. Details are not described herein again.

In a possible implementation, before the Bluetooth agent module performs permission verification on the application, the method further includes: The application obtains a first certificate used to prove permission of the application from a server. The Bluetooth agent module performs permission verification on the application includes: The Bluetooth agent module performs permission verification on the application based on the first certificate.

For a process of performing permission verification by using a certificate on a server side, refer to steps S501 to S503 in the example described in FIG. 15. Details are not described herein again.

In a possible implementation, the method further includes: When the application is uninstalled from the electronic device, the Bluetooth agent module indicates the Bluetooth chip to stop scanning for the first device identifier.

For an APP deregistration process, refer to the example described in FIG. 13. Details are not described herein again.

It may be understood that Bluetooth scanning is used as an example for description in this embodiment of this application. However, this embodiment of this application is not limited to a service executed through Bluetooth scanning. Alternatively, other short-distance scanning may be used, for example, Wi-Fi scanning, a Wi-Fi connection, or a ZigBee connection. This is not limited in this embodiment of this application.

For example, in a Wi-Fi scanning or Wi-Fi connection scenario, the Bluetooth agent module 105 may be a Wi-Fi agent module. Similar to the Bluetooth agent module 105, the Wi-Fi agent module is connected to a Wi-Fi chip and connected to a corresponding application. The Wi-Fi agent module is configured to indicate the Wi-Fi chip to scan for a device identifier, and establish a channel to a device based on the device identifier or notify an application corresponding to the device identifier.

An embodiment of this application further provides a computer-readable storage medium. The computer-readable storage medium stores instructions. When the instructions are run on a computer or a processor, the computer or the processor is enabled to perform one or more steps according to any one of the foregoing methods.

An embodiment of this application further provides a computer program product including instructions. When the computer program product runs on a computer or a processor, the computer or the processor is enabled to perform one or more steps in any one of the foregoing methods.

In the foregoing embodiments, all or some of the functions may be implemented by using software, hardware, or a combination of software and hardware. When the software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid-state disk, SSD)), or the like.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A Bluetooth scanning method, performed by an electronic device, wherein the electronic device comprises a Bluetooth agent module and a secure element (SE), wherein the SE comprises an applet, and the method comprises:
    receiving, by the electronic device, a first device identifier sent by a first device;
    in response to the receiving the first device identifier, determining, by the electronic device, whether the first device is registered with the electronic device; establishing, by the Bluetooth agent module based on the determining that the first device is registered with the electronic device, a channel to the first device based on the first device identifier;
    receiving, by the Bluetooth agent module, a ciphertext verification instruction from the first device through the channel;
    in response to the receiving the ciphertext verification, obtaining, by the Bluetooth agent module, a first ciphertext from the applet of the SE;
    sending, by the Bluetooth agent module, the first ciphertext to the first device, wherein the first device executes a corresponding service when the electronic device or the Bluetooth agent module receives an indication that a verification of the first ciphertext succeeds.

2. The Bluetooth scanning method according to claim 1, wherein the determining, by the electronic device, whether the first device is registered with the electronic device comprises: comparing, by the electronic device, the first device identifier with a device identifier that is of a registered device and that is stored in the Bluetooth agent module.

3. The Bluetooth scanning method according to claim 1, further comprising:
    obtaining, by the Bluetooth agent module, service information corresponding to the first device identifier, and sending the service information to the first device through the channel.

4. The Bluetooth scanning method according to claim 3, wherein the service information comprises verification information, the verification information is configured to allow the first device to perform verification based on locally stored information and the verification information, and a corresponding service is executed if the verification succeeds.

5. The service transaction method according to claim 3, wherein the service information is verification result information, and the verification result information is sent to a server, so that the server executes a corresponding service based on the verification result information.

6. The Bluetooth scanning method according to claim 1, wherein the first ciphertext is information related to verification of an electronic vehicle key, and executing the corresponding service refers to unlocking a corresponding vehicle lock.

7. The Bluetooth scanning method according to claim 3, wherein after the establishing, by the Bluetooth agent module, a channel to the first device based on the first device identifier, the method further comprises:
notifying, by the Bluetooth agent module, an application corresponding to the first device identifier that the channel has been established;
obtaining, by the application, the service information corresponding to the first device identifier;
sending, by the application, the service information corresponding to the first device identifier to the Bluetooth agent module; and
sending, by the Bluetooth agent module, the service information corresponding to the first device identifier to the first device through the channel.

8. The Bluetooth scanning method according to claim 7, wherein after the notifying, by the Bluetooth agent module based on the first device identifier, the application corresponding to the first device identifier that the channel has been established, the method further comprises:
sending, by the Bluetooth agent module, the service information from the first device to the application, so that the application displays the service information to a user.

9. The Bluetooth scanning method according to claim 1, wherein the Bluetooth agent module is an application/interface at an application framework layer.

10. The Bluetooth scanning method according to claim 1, wherein before the electronic device determines whether the first device is registered with the electronic device, the Bluetooth agent module indicates the electronic device to scan for a device identifier.

11. A electronic device, wherein the electronic device comprises at least one processor, a memory, a Bluetooth agent module, and a secure element (SE) wherein the SE includes an applet, and the memory is coupled to the at least one processor, wherein the memory stores programming instructions that, when executed by the at least one processor, cause the electronic device to:
receive a first device identifier sent by a first device;
in response to the receiving the first device identifier, determine whether the first device is registered with the electronic device; establish, by the Bluetooth agent module, a channel to the first device based on the first device identifier, based on the determining that the first device is registered with the electronic device;
receive, by the Bluetooth agent module, a ciphertext verification instruction from the first device through the channel;
in response to the receiving the ciphertext verification, obtain a first ciphertext from the applet of the SE by the Bluetooth agent module;
send the first ciphertext to the first device by the Bluetooth agent module, wherein the first device executes a corresponding service when the electronic device or the Bluetooth agent module receives an indication that a verification of the first ciphertext succeeds.

12. The electronic device according to claim 11, wherein the determining whether the first device is registered with the electronic device comprises:
compare the first device identifier with a device identifier that is of a registered device and that is stored in the Bluetooth agent module.

13. The electronic device according to claim 11, wherein the memory stores programming instructions that, when executed by the at least one processor, further cause the electronic device to:
obtain, by the Bluetooth agent module, service information corresponding to the first device identifier, and send the service information to the first device through the channel.

14. The electronic device according to claim 13, wherein the service information comprises verification information, the verification information is configured to allow the first device to perform verification based on locally stored information and the verification information, and a corresponding service is executed if the verification succeeds.

15. The electronic device according to claim 13, wherein the service information is verification result information, and the verification result information is sent to a server, so that the server executes a corresponding service based on the verification result information.

16. The electronic device according to claim 11, wherein the first ciphertext is information related to verification of an electronic vehicle key, and executing the corresponding service refers to unlocking a corresponding vehicle lock.

17. The electronic device according to claim 13, wherein the memory stores programming instructions that, when executed by the at least one processor, further cause the electronic device to:
after the establishing, by the Bluetooth agent module, a channel to the first device based on the first device identifier, notify, by the Bluetooth agent module an application corresponding to the first device identifier that the channel has been established;
obtain the service information corresponding to the first device identifier by the application;
send the service information corresponding to the first device identifier to the Bluetooth agent module by the application; and
send the service information corresponding to the first device identifier to the first device through the channel by the Bluetooth agent module.

18. The electronic device according to claim 17, wherein the memory stores programming instructions that, when executed by the at least one processor, further cause the electronic device to:
after the notifying the application corresponding to the first device identifier by the Bluetooth agent module, send the service information from the first device to the application by the Bluetooth agent module, so that the application displays the service information to a user.

19. The electronic device according to claim 11, wherein the Bluetooth agent module is an application/interface at an application framework layer.

20. The electronic device according to claim 11, wherein the memory stores programming instructions that, when executed by the at least one processor, further cause the electronic device to:
before the determining whether the first device is registered with the electronic device, scan for a device identifier by the Bluetooth agent module.

* * * * *